(12) United States Patent
Kawai et al.

(10) Patent No.: US 10,503,278 B2
(45) Date of Patent: Dec. 10, 2019

(54) INFORMATION PROCESSING APPARATUS AND INFORMATION PROCESSING METHOD THAT CONTROLS POSITION OF DISPLAYED OBJECT CORRESPONDING TO A POINTING OBJECT BASED ON POSITIONAL RELATIONSHIP BETWEEN A USER AND A DISPLAY REGION

(71) Applicant: SONY CORPORATION, Tokyo (JP)

(72) Inventors: Nobuaki Kawai, Tokyo (JP); Toru Nagara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/780,924

(22) PCT Filed: Sep. 20, 2016

(86) PCT No.: PCT/JP2016/077746
§ 371 (c)(1),
(2) Date: Jun. 1, 2018

(87) PCT Pub. No.: WO2017/110178
PCT Pub. Date: Jun. 29, 2017

(65) Prior Publication Data
US 2018/0356905 A1    Dec. 13, 2018

(30) Foreign Application Priority Data

Dec. 22, 2015 (JP) ................................ 2015-250233

(51) Int. Cl.
*G06F 3/033* (2013.01)
*G09G 5/08* (2006.01)
(Continued)

(52) U.S. Cl.
CPC ............ *G06F 3/0346* (2013.01); *G01S 13/08* (2013.01); *G01S 17/08* (2013.01); *G06F 3/011* (2013.01);
(Continued)

(58) Field of Classification Search
None
See application file for complete search history.

(56) References Cited

U.S. PATENT DOCUMENTS 8,902,198 B1 * 12/2014 Karakotsios ............ G06F 3/017
345/175
2011/0057875 A1 * 3/2011 Shigeta .................... G06F 3/011
345/156

(Continued)

FOREIGN PATENT DOCUMENTS

JP    2003-234983 A    8/2003
JP    2015-035060 A    2/2015
(Continued)

OTHER PUBLICATIONS

International Search Report and Written Opinion of PCT Application No. PCT/JP2016/077746, dated Dec. 6, 2016, 07 pages of ISRWO.

*Primary Examiner* — Lunyi Lao
*Assistant Examiner* — Kirk W Hermann
(74) *Attorney, Agent, or Firm* — Chip Law Group

(57) ABSTRACT

An information processing apparatus includes a control unit which, on a basis of positional relationship between a user and a display region and a first coordinate on the display region pointed by a pointing object of the user, controls a relationship between the first coordinate and a second coordinate at which a display object corresponding to the pointing object is to be displayed.

16 Claims, 16 Drawing Sheets

(51) Int. Cl.
*G06F 3/0346* (2013.01)
*G06F 3/0481* (2013.01)
*G06F 3/01* (2006.01)
*G06F 3/03* (2006.01)
*G01S 13/08* (2006.01)
*G01S 17/08* (2006.01)
*G06F 3/0484* (2013.01)

(52) U.S. Cl.
CPC .......... *G06F 3/0304* (2013.01); *G06F 3/0481* (2013.01); *G06F 3/04845* (2013.01)

(56) References Cited

U.S. PATENT DOCUMENTS

| | | | | |
|---|---|---|---|---|
| 2011/0119640 A1* | 5/2011 | Berkes | ............... | G06F 3/011 |
| | | | | 715/863 |
| 2012/0320092 A1* | 12/2012 | Shin | ............... | G06F 3/017 |
| | | | | 345/633 |
| 2014/0201674 A1* | 7/2014 | Holz | ............... | G06F 3/017 |
| | | | | 715/782 |
| 2015/0324026 A1 | 11/2015 | Hashimoto et al. | | |
| 2016/0239081 A1* | 8/2016 | Imoto | ............... | G06F 3/0481 |
| 2017/0103733 A1* | 4/2017 | Li | ............... | H04N 21/4223 |

FOREIGN PATENT DOCUMENTS

| | | | |
|---|---|---|---|
| JP | 2015035060 A | * | 2/2015 |
| JP | 2015-215701 A | | 12/2015 |

* cited by examiner

FIG. 2
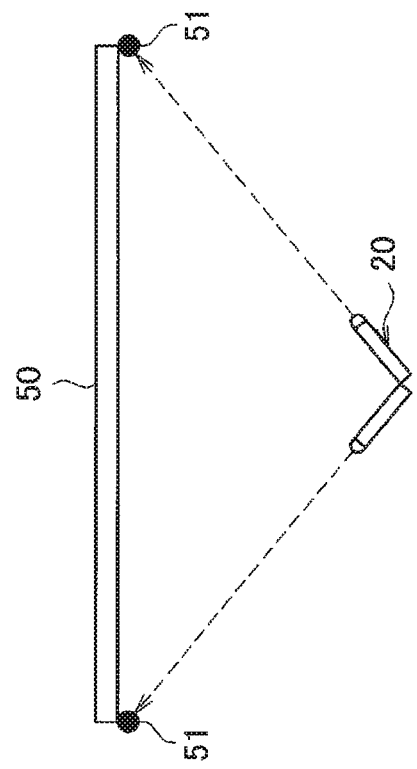
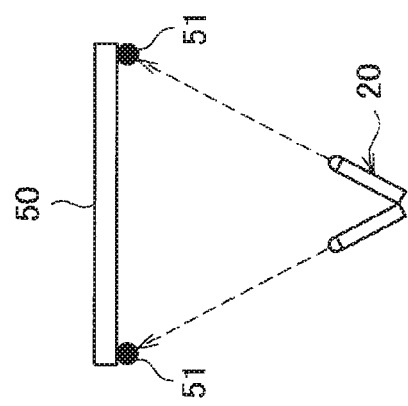
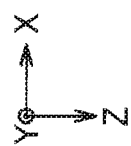

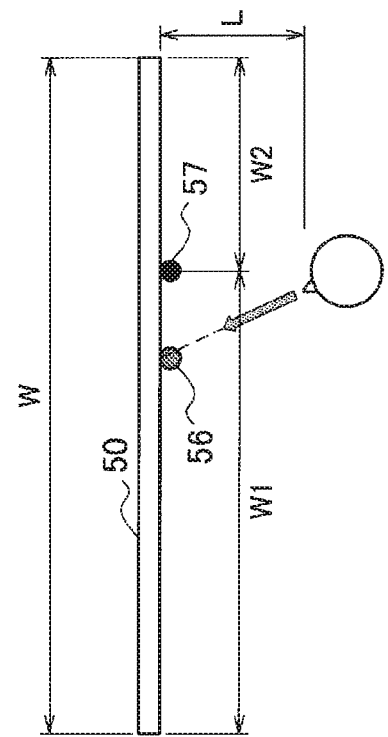
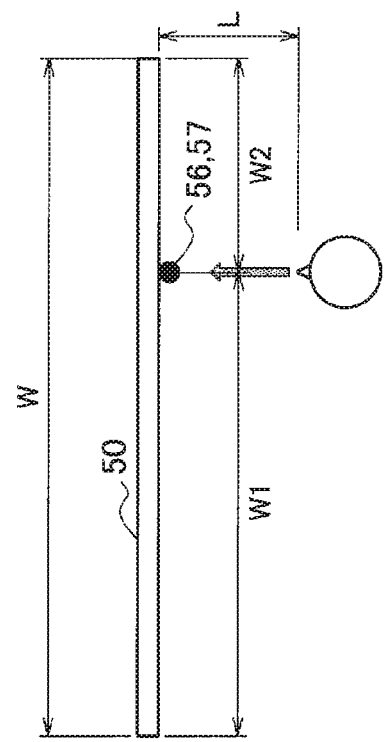
FIG. 13

INFORMATION PROCESSING APPARATUS AND INFORMATION PROCESSING METHOD THAT CONTROLS POSITION OF DISPLAYED OBJECT CORRESPONDING TO A POINTING OBJECT BASED ON POSITIONAL RELATIONSHIP BETWEEN A USER AND A DISPLAY REGION

CROSS REFERENCE TO RELATED APPLICATIONS

This application is a U.S. National Phase of International Patent Application No. PCT/JP2016/077746 filed on Sep. 20, 2016, which claims priority benefit of Japanese Patent Application No. JP 2015-250233 filed in the Japan Patent Office on Dec. 22, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, a display apparatus such as a display and a projector becomes larger, and a technology for providing a comfortable UI to a user in a large display region is desired. For example, the following Patent Literature 1 discloses a technology of displaying a UI in accordance with positional relationship between a user and a screen, and the number of persons.

CITATION LIST

Patent Literature

Patent Literature 1: JP 2015-90547A

DISCLOSURE OF INVENTION

Technical Problem

However, the technology disclosed in the above-described Patent Literature 1 is merely a technology of controlling display positions of UI elements such as an icon, a menu part and an application window. Given comfort for a user, improvement of operational feeling is also an important point. For example, while gesture operation or pointing operation using an apparatus such as a laser pointer enables intuitive operation of an operation target such as a pointer, there is a case where it is difficult to operate the operation target at will depending on a situation. Therefore, it is desirable to provide a mechanism which enables further improvement of operational feeling of pointing operation.

Solution to Problem

According to the present disclosure, there is provided an information processing apparatus including a control unit configured to, on a basis of positional relationship between a user and a display region and a first coordinate on the display region pointed by a pointing object of the user, control relationship between the first coordinate and a second coordinate at which a display object corresponding to the pointing object is to be displayed.

In addition, according to the present disclosure, there is provided an information processing method including, on a basis of positional relationship between a user and a display region and a first coordinate on the display region pointed by a pointing object of the user, causing a processor to control relationship between the first coordinate and a second coordinate at which a display object corresponding to the pointing object is to be displayed.

In addition, according to the present disclosure, there is provided a program for causing a computer to function as a control unit configured to, on a basis of positional relationship between a user and a display region and a first coordinate on the display region pointed by a pointing object of the user, control relationship between the first coordinate and a second coordinate at which a display object corresponding to the pointing object is to be displayed.

Advantageous Effects of Invention

As described above, according to the present disclosure, a mechanism which enables further improvement of operational feeling of pointing operation is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an explanatory diagram for explaining a technical problem of the display control system according to the embodiment.

FIG. 13 is an explanatory diagram for explaining display control processing according to a fifth example.

MODE(S) FOR CARRYING OUT THE INVENTION

Figure 1:
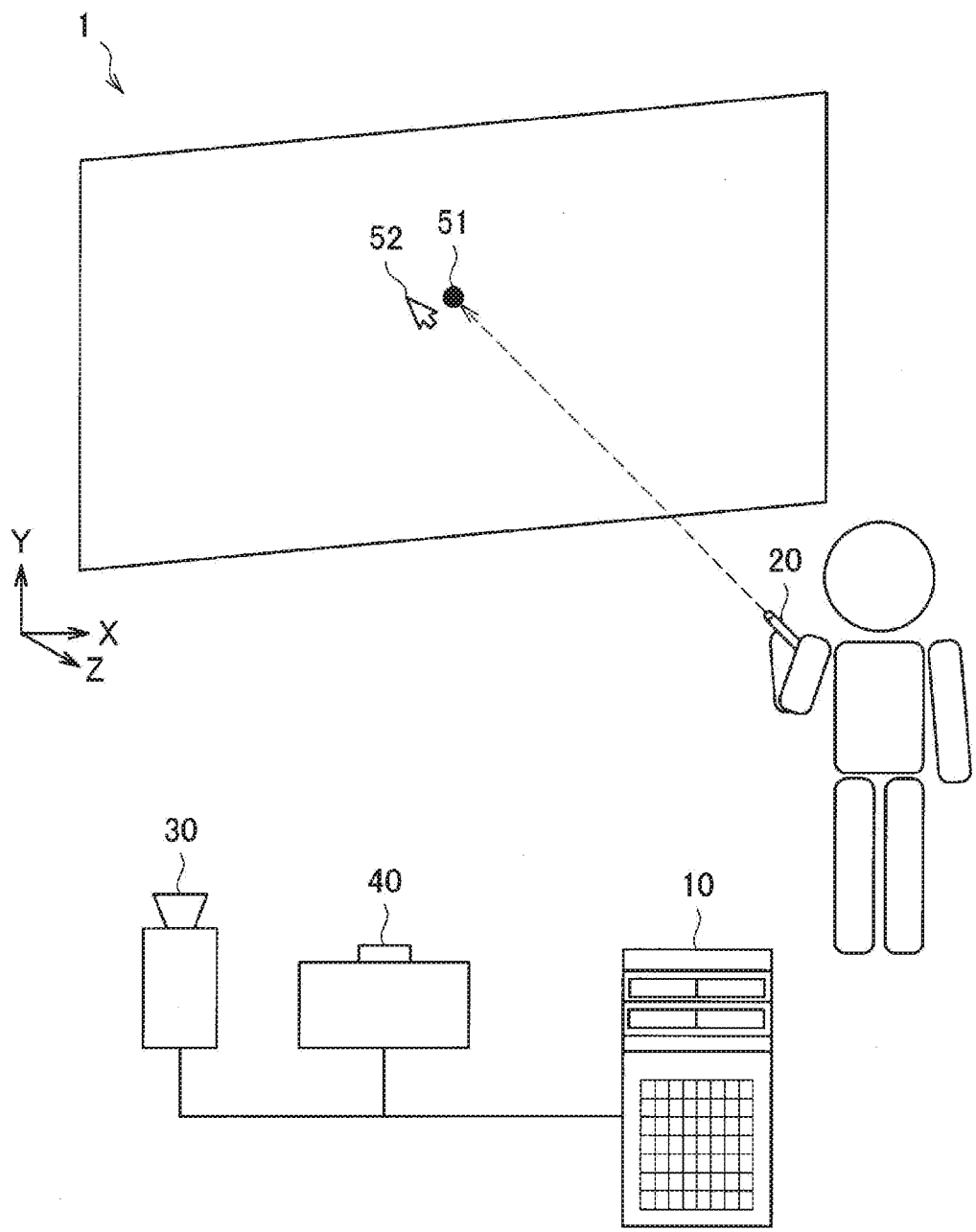
FIG. 1 is a diagram for explaining outline of a display control system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Outline
2. Basic technology
2.1. Configuration example
2.2. Processing flow
3. Specific examples
3.1. First example
3.2. Second example
3.3. Third example
3.4. Fourth example
3.5. Fifth example
3.6. Sixth example
3.7. Seventh example
3.8. Supplementary note
4. Hardware configuration example
5. Conclusion

1. OUTLINE

First, outline of a display control system according to an embodiment of the present disclosure will be described with reference to FIG. 1 and FIG. 2.

FIG. 1 is a diagram for explaining outline of a display control system 1 according to the present embodiment. As illustrated in FIG. 1, the display control system 1 includes, for example, a display control apparatus 10, a pointing object 20, an imaging apparatus 30 and a display apparatus 40.

The display apparatus 40 has a function of displaying an image (a still image or a moving image) on the basis of display control information output from the display control apparatus 10. Typically, the display apparatus 40 is implemented with a projector, and an image is projected on a display region 50. Note that the shape of the display region is arbitrary, and can be a rectangular shape, a circular shape, a plane, a shape having concavity and convexity, or the like. Further, the display region can be a solid such as hologram. The display apparatus 40 and the display region 50 may be integrally formed. In this case, the display apparatus 40 is implemented with a liquid crystal display (LCD), an organic light-emitting diode (OLED), or the like. Further, the display region 50 may be a virtual screen, and the display apparatus 40 may be a head mounted display (HMD).

The pointing object 20 has a function of pointing an arbitrary coordinate on the display region 50. For example, the pointing object 20 is implemented with an apparatus such as a laser pointer. Further, the pointing object 20 may be implemented with the finger of the user, or the like. In the following description, a coordinate (corresponding to a first coordinate) of a pointed point 51 pointed by the pointing object 20 in the display region 50 will be also referred to as an original coordinate. Note that, in the case where the pointed point 51 deviates from the display region 50, a coordinate on a virtual plane which is an extension of an end portion of the display region 50 is set as the original coordinate.

The imaging apparatus 30 has a function of capturing an image (a still image or a moving image) and outputting the captured image to the display control apparatus 10. For example, the imaging apparatus 30 captures an image of the display region 50, the pointing object 20, a user who operates the pointing object 20, or the like. Note that the imaging apparatus 30 is an example of an apparatus which acquires information relating to these imaging targets, and the display control system 1 may include other arbitrary apparatuses. For example, the display control system 1 may include a depth sensor, an infrared sensor, a radio wave sensor, or the like, along with the imaging apparatus 30 or in place of the imaging apparatus 30.

The display control apparatus 10 has a function of controlling display by the display apparatus 40. Particularly, the display control apparatus 10 has a function of controlling display relating to a display object 52 to be displayed in the display region 50. The display object 52 is, for example, implemented with a pointer, a focus, or the like. In the following description, description will be provided assuming that the display object 52 is a pointer. The display control apparatus 10 controls relationship between the pointed point 51 and the pointer 52. That is, the display control apparatus 10 displays the pointer 52 at the pointed point 51 or displays the pointer at a position displaced from the pointed point 51 (that is, with an offset). Control of the relationship is realized by, for example, control of relative coordinates between the pointed point 51 and the pointer 52. Here, the relationship is concept including a relative distance, a relative direction, relative acceleration, or the like, between the pointed point 51 and the pointer 52. In the following description, a coordinate (corresponding to a second coordinate) of the display object 52 to be displayed in the display region 50 will be also referred to as a display coordinate.

Note that, in the present specification, orthogonal coordinate axes forming two-dimensional space of the display region 50 are respectively set as an X axis and a Y axis. More simply, a horizontal direction of the display region 50 is set as the X axis, and a vertical direction is set as the Y axis. Further, a coordinate axis orthogonal to the display region 50 is set as a Z axis. More simply, a direction of the user seen from the display region 50 is set as the Z axis.

FIG. 2 is an explanatory diagram for explaining a technical problem of the display control system 1 according to the present embodiment. FIG. 2 illustrates a situation where two different display regions 50 with different lengths in the X axis direction are seen from the Y axis direction. As illustrated in FIG. 2, as the length in the X axis direction is longer, motion required for pointing from end to end in the X axis direction with the pointing object 20 (that is, motion of tilting the pointing object 20) becomes larger. In the case where the original coordinate matches the display coordinate, because the motion of the pointing object 20 matches motion of the pointer 52, intuitive operational feeling is provided. Meanwhile, in the case where a pointing range is wide, a range in which the pointing object 20 is moved becomes wide, which may cause significant degradation of operational feeling, such as forcing a user to take an unnatural attitude for pointing a portion near the end.

Therefore, the display control system 1 according to the present embodiment provides an offset between the original coordinate and the display coordinate in accordance with a situation. By this means, the motion of the pointer 52 becomes larger than the motion of the pointing object 20. Therefore, even in the case where the pointing range is wide, it is possible to cover the wide range with less motion of the pointing object 20, so that it is possible to prevent the user from, for example, taking an unnatural attitude for pointing a portion near the end. Note that, because it is considered that the user normally operates the pointer 52 while watching the pointer 52 instead of watching the pointing object 20, it is considered that displacement between the original coordinate and the display coordinate is less likely to be perceived.

2. BASIC TECHNOLOGY

A basic configuration example and flow of processing of the present embodiment will be described below with reference to FIG. 3 and FIG. 4.

2.1. Configuration Example

Figure 3:
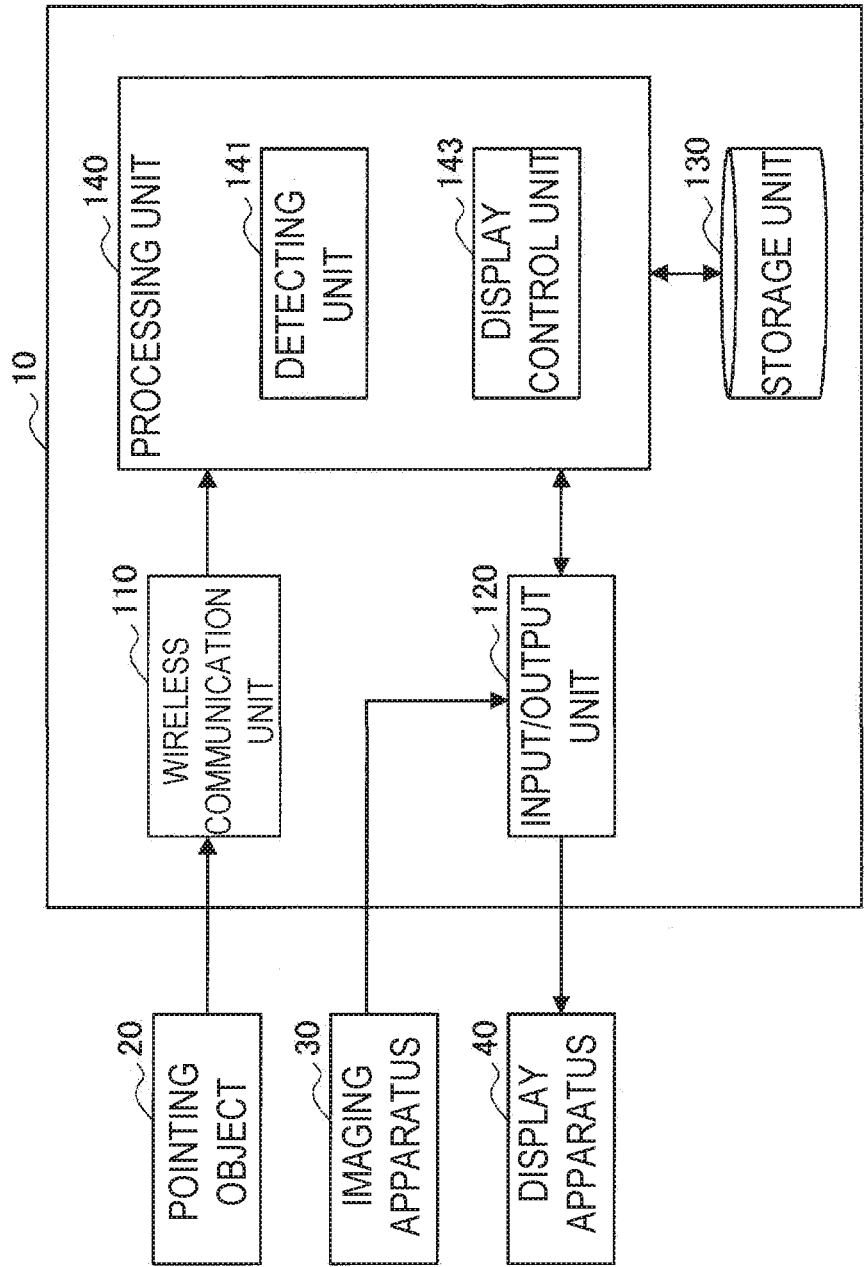
FIG. 3 is a block diagram illustrating an example of a logical configuration of a display control apparatus according to the embodiment.

FIG. 3 is a block diagram illustrating an example of a logical configuration of the display control apparatus 10 according to the present embodiment. As illustrated in FIG. 3, the display control apparatus 10 includes a wireless communication unit 110, an input/output unit 120, a storage unit 130 and a processing unit 140.

(1) Wireless Communication Unit 110

The wireless communication unit 110 is a wireless communication interface which mediates wireless communication with other apparatuses by the display control apparatus 10. For example, the wireless communication unit 110 outputs information received from the pointing object 20 to the processing unit 140. The wireless communication unit 110 can receive information indicating user operation such as, for example, button operation with respect to the pointing object 20. Further, the wireless communication unit 110 can receive sensor information sensed with an inertial sensor, or the like, included in the pointing object 20. Note that, in the case where the pointing object 20 is an object which does not have a wireless communication function, such as the finger of the user, the wireless communication unit 110 may be omitted.

(2) Input/Output Unit 120

The input/output unit 120 is an interface which mediates communication with other apparatuses by the display control apparatus 10. For example, the input/output unit 120 acquires a captured image from the imaging apparatus 30, outputs the captured image to the processing unit 140, and outputs display control information acquired from the processing unit 140 to the display apparatus 40.

(3) Storage Unit 130

The storage unit 130 temporarily or permanently stores a program and various kinds of data for operation of the display control apparatus 10.

(4) Processing Unit 140

The processing unit 140 provides various functions of the display control apparatus 10. As illustrated in FIG. 3, the processing unit 140 includes a detecting unit 141 and a display control unit 143. Note that the processing unit 140 can further include components other than these components. That is, the processing unit 140 can perform operation other than operation of these components.

The detecting unit 141 has a function of detecting various kinds of information from information acquired by the display control apparatus 10. For example, the detecting unit 141 recognizes positional relationship between the user and the display region 50, attitude of the user, positional relationship between the pointing object 20 and the display region 50, attitude of the pointing object 20, or the like, on the basis of the captured image from the imaging apparatus 30. Further, the detecting unit 141 can recognize attitude of the pointing object 20 on the basis of sensor information of the pointing object 20. The detecting unit 141 then detects the original coordinate on the basis of these detection results. In addition, in the case where the pointing object 20 is a laser pointer, the detecting unit 141 may detect the original coordinate by recognizing the center of a laser irradiation point (that is, a bright point) on the display region 50 included in the captured image from the imaging apparatus 30.

The display control unit 143 determines the display coordinate on the basis of the detection result by the detecting unit 141. In this event, the display control unit 143 controls relationship between the original coordinate on the display region 50 pointed by the pointing object 20 and the display coordinate at which the display object 52 corresponding to the pointing object 20 is to be displayed. Particularly, the display control unit 143 controls the relationship between the original coordinate and the display coordinate on the basis of positional relationship between the user and the display region 50 (such as, for example, a reference point which will be described later, a distance between the display region 50 and the user and displacement of the user from the center of the display region 50) and the original coordinate. With such display control, the user can point the whole display region 50 with the pointer 52 through operation which is in accordance with the positional relationship with the display region 50 and which is not unnatural. Note that the display control unit 143 causes a position of the pointed point 51 to be reflected to a position of the pointer 52 in real time by using the same coordinate system for a coordinate system of the original coordinate and a coordinate system of the display coordinate.

The display control unit 143 generates display control information for causing the pointer 52 to be displayed at the display coordinate to which a control result of the relationship between the original coordinate and the display coordinate is reflected and outputs the display control information to the display apparatus 40 by way of the input/output unit 120.

2.2. Processing Flow

Figure 4:
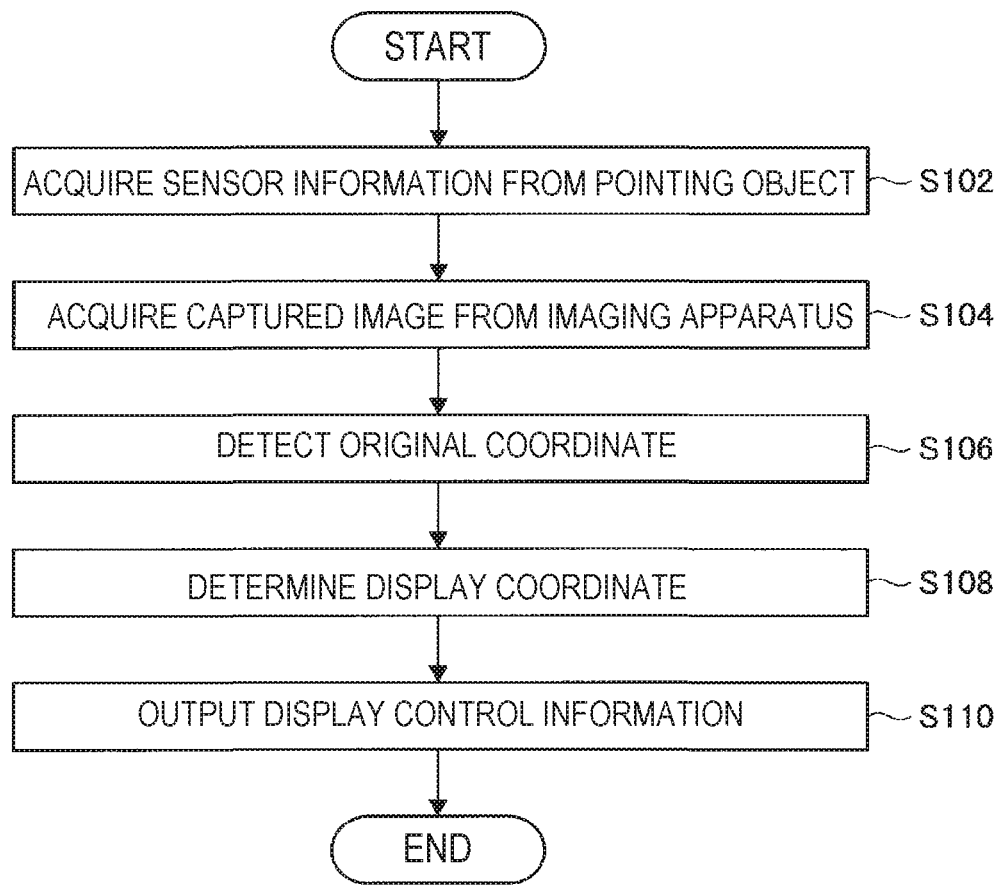
FIG. 4 is a flowchart illustrating an example of flow of display control processing to be executed at the display control apparatus according to the embodiment.

FIG. 4 is a flowchart illustrating an example of flow of display control processing to be executed at the display control apparatus 10 according to the present embodiment.

As illustrated in FIG. 4, first, the wireless communication unit 110 acquires sensor information from the pointing object 20 (step S102). In the case where a sensor is not included in the pointing object 20, this step will be omitted. Then, the input/output unit 120 acquires a captured image from the imaging apparatus 30 (step S104). The detecting unit 141 then detects the original coordinate on the basis of the sensor information and the captured image (step S106). The display control unit 143 then determines the display coordinate (step S108). A specific example of a method for determining the display coordinate used here will be described in detail later using a plurality of examples. Subsequently, the input/output unit 120 outputs display control information including information indicating the display coordinate determined by the display control unit 143 to the display apparatus 40 and causes the display control information to be reflected to display in the display region 50 (step S110).

The processing ends as described above.

3. SPECIFIC EXAMPLES

Subsequently, a specific example of display control by the display control apparatus 10 (for example, the display control unit 143) will be described with reference to FIG. 5 to FIG. 17. Note that, while, in the following description, attention is focused on the X axis direction to simplify explanation, the same explanation also applies to the Y axis direction.

3.1. First Example

The present example is a form in which an offset based on setting of a movable range of the pointed point 51 (that is, the original coordinate) is added.

Figure 5:
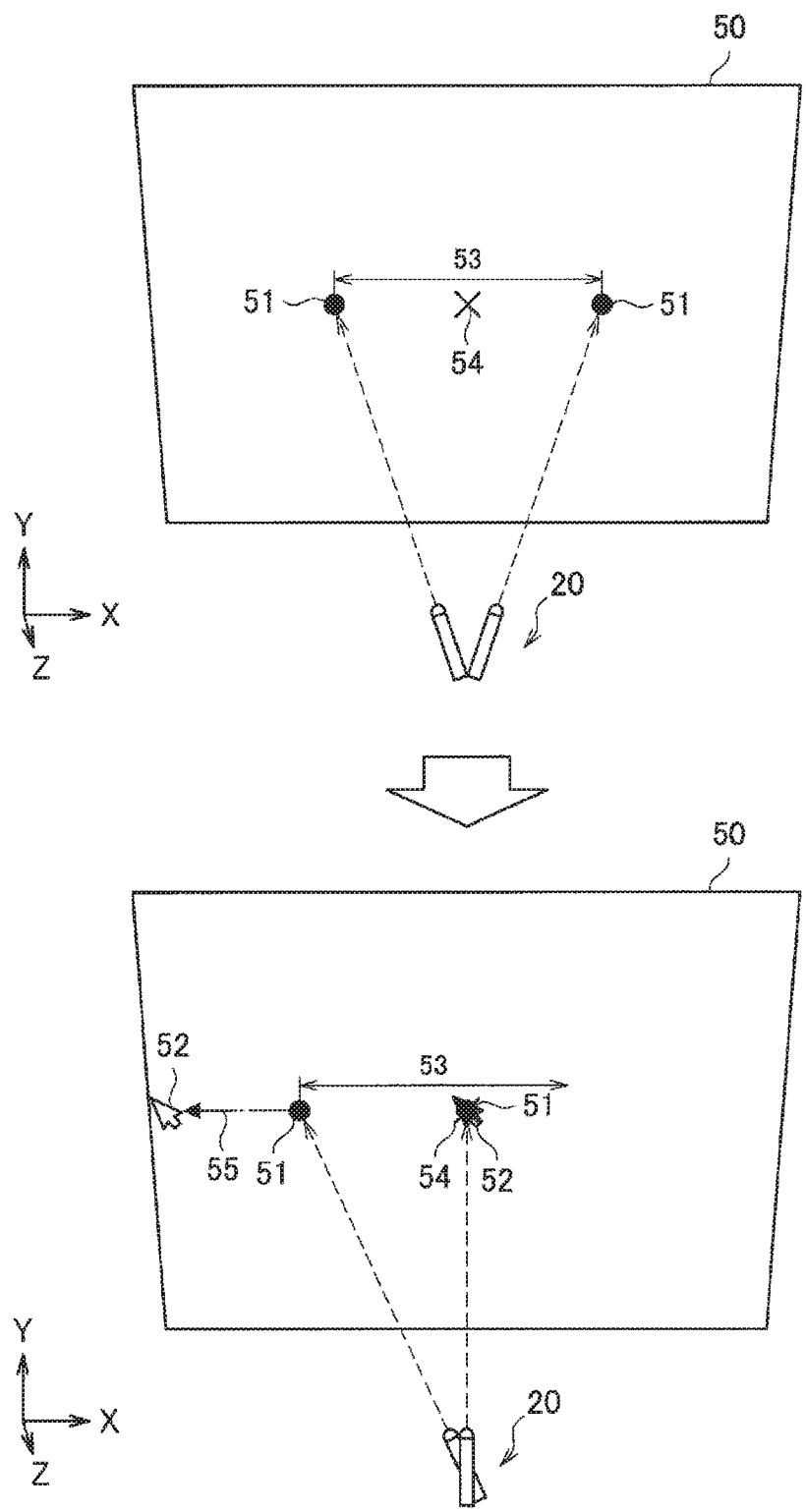
FIG. 5 is an explanatory diagram for explaining display control processing according to a first example.

FIG. 5 is an explanatory diagram for explaining display control processing according to the first example. As illustrated in an upper part of FIG. 5, first, the user sets a movable range 53 of the original coordinate, which indicates a range in which the pointed point 51 is moved. Then, as illustrated in a lower part of FIG. 5, the display control apparatus 10 controls relationship between the original coordinate and the display coordinate on the basis of setting of the movable range 53 of the original coordinate. For example, the display control apparatus 10 increases a relative distance between the original coordinate and the display coordinate (that is, a length of the offset 55) as the original coordinate approaches an end portion of the movable range 53. In the example illustrated in FIG. 5, the pointed point 51 matches the pointer 52 near the center of the movable range 53 (that is, there is no offset), and, in the case where the pointed point 51 is located at the end portion of the movable range 53, the pointer 52 is displayed at an end portion of the display region 50 while a long offset 55 is added to the pointed point 51. With such display control, it is possible to point the whole width of the display region 50 using the pointer 52 through operation of the pointing object 20 within the movable range 53 narrower than the width of the display region 50, that is, through operation which is not unnatural. The display control apparatus 10 may make a maximum value of the relative distance between the original coordinate and the display coordinate (that is, a distance of the offset in the case where the original coordinate is located at the end portion of the movable range 53) larger as the movable range 53 is narrower. By this means, even in the case where the movable range 53 is narrow, it is possible to point the whole width of the display region 50 using the pointer 52 through operation of the pointing object 20 within the movable range 53.

Here, the center for moving the pointed point 51 is set as a reference point 54. The reference point 54 is set on the basis of positional relationship between the user and the display region 50. Typically, the reference point 54 is a front point of the user (that is, a point at which a vertical line from the user to the display region 50 intersects with the display region 50). From another viewpoint, the reference point 54 can be said as a center point of the movable range 53. The reference point 54 may be displaced from the front point in accordance with attitude of the user (such as, for example, a direction of the body and a direction that the arm which grasps the pointing object 20 faces). Further, the reference point 54 may be the center point of the display region 50 or may be displaced from the center point of the display region 50 in accordance with the above-described positional relationship, attitude of the user, or the like. Note that, concerning the Y axis direction, the reference point 54 can be set in accordance with the center of the display region 50, the front point of the user, height of a point of view of the user, height at which the pointing object 20 is grasped, or the like. Note that the reference point 54 may be located on the display region 50 or may be located outside the display region 50.

The display control apparatus 10 may increase the relative distance from the original coordinate to the display coordinate as the distance from the reference point 54 to the original coordinate increases. In the example illustrated in FIG. 5, in the case where the pointed point 51 is located at the reference point 54, the pointed point 51 matches the pointer 52, and, in the case where the pointed point 51 is located far from the reference point 54, the pointer 52 is displayed at the end portion of the display region 50 while a long offset 55 is added to the pointed point 51. With such display control, it is possible to make the relative distance smaller in a region where the user is likely to notice displacement between the original coordinate and the display coordinate and make the relative distance larger in a region where the user is less likely to notice the displacement. Note that increase in the distance from the reference point 54 to the original coordinate may be regarded as the original coordinate approaching the end portion of the movable range 53.

3.2. Second Example

The present example is an example where an offset in accordance with a distance between the user and the display region 50 is added.

Figure 6:
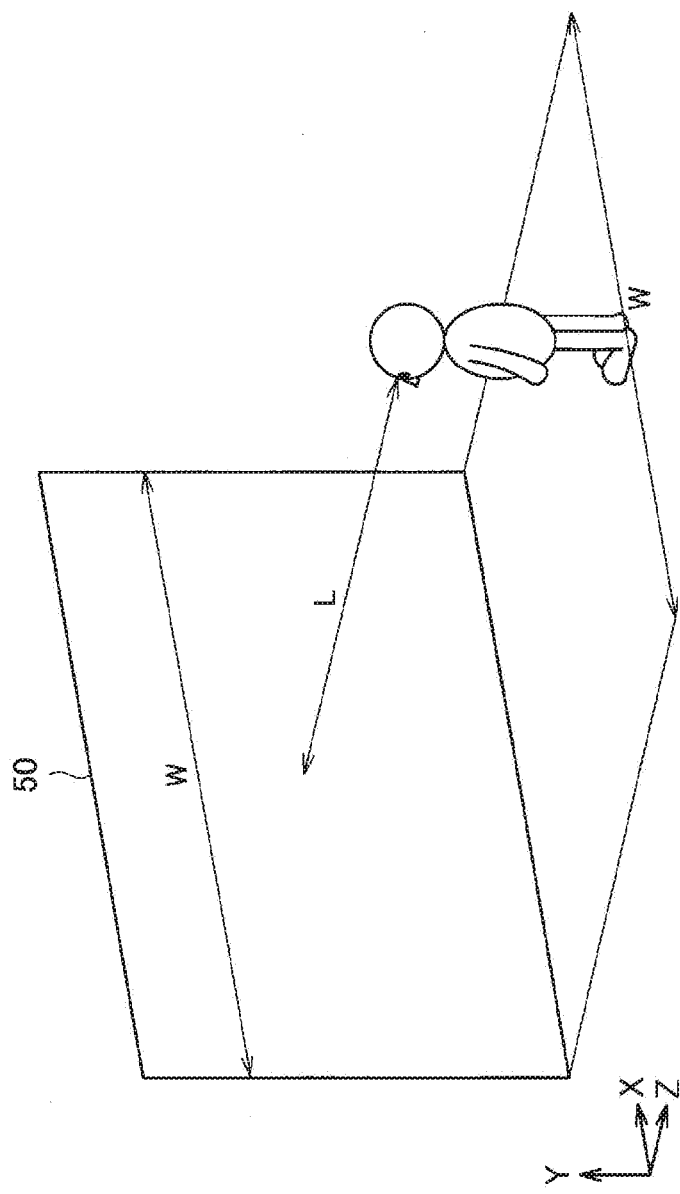
FIG. 6 is an explanatory diagram for explaining display control processing according to a second example.

FIG. 6 is an explanatory diagram for explaining display control processing according to a second example. As illustrated in FIG. 6, a width of the display region 50 in the X axis direction is set as a width W, and a distance from the display region 50 to the user in the Z axis direction is set as a distance L. Note that the distance L is an example of positional relationship detected by the detecting unit 141, and can be detected through, for example, image recognition or with a depth sensor, or the like. A specific control example of the relationship between the original coordinate and the display coordinate will be described below with reference to FIG. 7 and FIG. 8.

Figure 7:
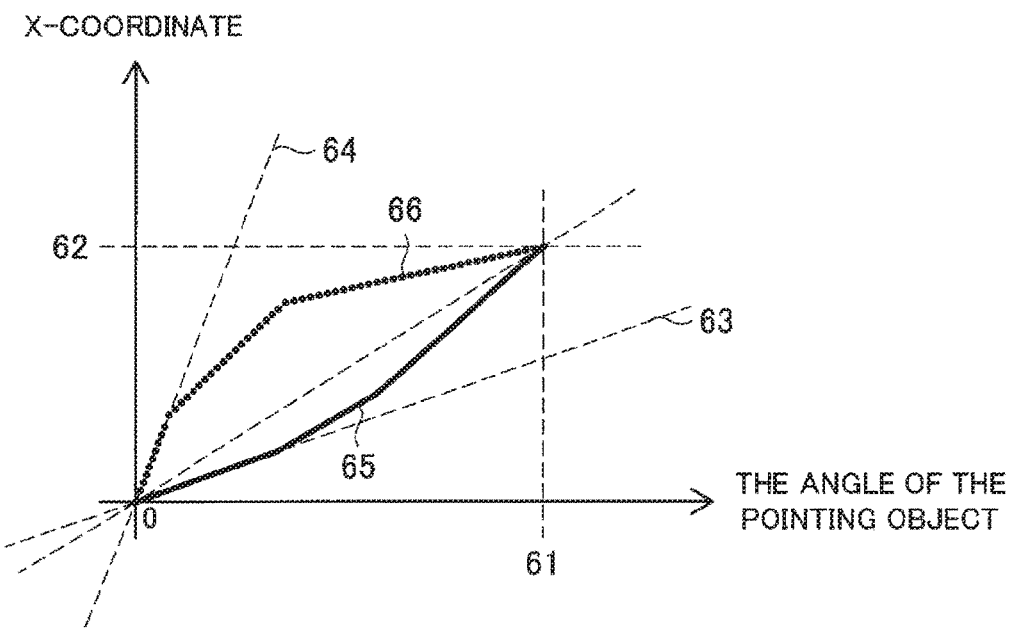
FIG. 7 is an explanatory diagram for explaining display control processing according to a second example.

FIG. 7 is an explanatory diagram for explaining the display control processing according to the second example. More specifically, FIG. 7 is a diagram illustrating an example of an offset corresponding to the distance L. The horizontal axis indicates an angle of the pointing object 20 in the case where an angle in the case where the pointing object 20 points the reference point 54 is set at 0. This angle may be calculated on the basis of tilt of the pointing object 20, an angle between the hand which holds the pointing object 20 or which performs pointing and a forearm portion, attitude of the user, or the like. The vertical axis indicates an X coordinate on the display region 50 in the case where the X coordinate of the reference point 54 is set at 0. A reference numeral 61 is an upper limit value of the angle of the pointing object 20, and, for example, is an upper limit angle at which the user who grasps the pointing object 20 can naturally bend his/her wrist. A reference numeral 62 is an upper limit coordinate in the X axis direction, that is, a coordinate of the end portion of the display region 50.

The display control apparatus 10 can switch offset addition processing between in the case where the distance L is short and in the case where the distance L is long. For example, the display control apparatus 10 switches the offset addition processing in accordance with whether the distance L is shorter or longer than a threshold.

First, a case where the distance L is short (for example, the distance L is shorter than the threshold) will be described. A reference numeral 63 indicates the original coordinate corresponding to the angle of the pointing object 20 in the case where the distance L is short. A reference numeral 65 indicates the display coordinate corresponding to the angle of the pointing object 20 in the case where the distance L is short. A distance between the reference numeral 63 and the reference numeral 65 in the vertical axis direction at the same angle indicates a length of the offset. As illustrated in FIG. 7, as the angle becomes larger, the offset increases. That is, the display control apparatus 10 increases the relative distance as the distance from the reference point 54 to the original coordinate increases. Further, as illustrated in FIG. 7, the offset is added in a direction that displacement of the original coordinate from the reference point 54 is made further larger. That is, the display control apparatus 10 causes the display coordinate to be disposed on a side opposite to a side of the reference point 54 on the basis of the original coordinate. In other words, a direction from the reference point 54 to the original coordinate becomes the same or substantially the same as a direction from the original coordinate to the display coordinate (an angle formed by the both directions becomes less than ±90 degrees). For example, if the user points a positive direction on the X axis from the reference point 54, an offset is added in the positive direction on the X axis. In this event, displacement may occur in the Y axis direction.

In the case where the distance L is short, if the original coordinate is separated from the display coordinate when the user points the center of the display region 50, the user can feel a sense of discomfort. Therefore, as illustrated in FIG. 7, the display control apparatus 10 can avoid the user from feeling a sense of discomfort by making the relative distance zero or shortening the relative distance in the case where the distance from the reference point 54 to the original coordinate is short. Meanwhile, movement of the pointer 52 with respect to the angle becomes larger as the angle of the pointing object 20 becomes larger (that is, as the pointing object 20 points the end portion of the display region 50), and, even if the original coordinate is separated from the display coordinate, the user is less likely to feel a sense of discomfort. However, if the end portion of the display region 50 cannot be pointed without the angle of the pointing object 20 exceeding the upper limit angle at which the user can naturally bend his/her wrist, operational feeling is significantly impaired. Therefore, as illustrated in FIG. 7, the display control apparatus 10 enables the end portion of the display region 50 to be pointed with the pointing object 20 within a range of the upper limit angle at which the user can naturally bend his/her wrist by making the relative distance longer in the case where the distance from the reference point 54 to the original coordinate is long.

Subsequently, a case where the distance L is long (for example, the distance L is longer than the threshold) will be described. A reference numeral 64 indicates the original coordinate corresponding to the angle of the pointing object 20 in the case where the distance L is long. A reference numeral 66 indicates the display coordinate corresponding to the angle of the pointing object 20 in the case where the distance L is long. Then, a distance between the reference numeral 64 and the reference numeral 66 in the vertical axis direction at the same angle indicates a length of the offset. As illustrated in FIG. 7, as the angle becomes larger, the offset increases. That is, the display control apparatus 10 increases the relative distance as the distance from the reference point 54 to the original coordinate increases. Further, as illustrated in FIG. 7, the offset is added in a direction that displacement of the original coordinate from the reference point 54 is suppressed. That is, the display control apparatus 10 causes the display coordinate to be disposed at the same side as the side of the reference point 54 on the basis of the original coordinate. In other words, a direction opposite to a direction from the reference point 54 to the original coordinate becomes the same or substantially the same as a direction from the original coordinate to the display coordinate (an angle formed by the both directions becomes less than ±90 degrees). For example, if the user points a positive direction on the X axis from the reference point 54, an offset is added to a negative direction on the X axis. In this event, displacement may occur in the Y axis direction.

In the case where the distance L is long, movement of the pointer 52 with respect to the angle of the pointing object 20 is also large, that is, the pointer 52 becomes excessively sensitive. Therefore, as illustrated in FIG. 7, the display control apparatus 10 can lower the sensitivity of the pointer 52 to improve operational feeling of the user by adding an offset in a direction that displacement of the original coordinate from the reference point 54 is suppressed in accordance with increase in the angle.

An example of switching of the offset addition processing in accordance with the distance L has been described above. Subsequently, another example will be described with reference to FIG. 8.

Figure 8:
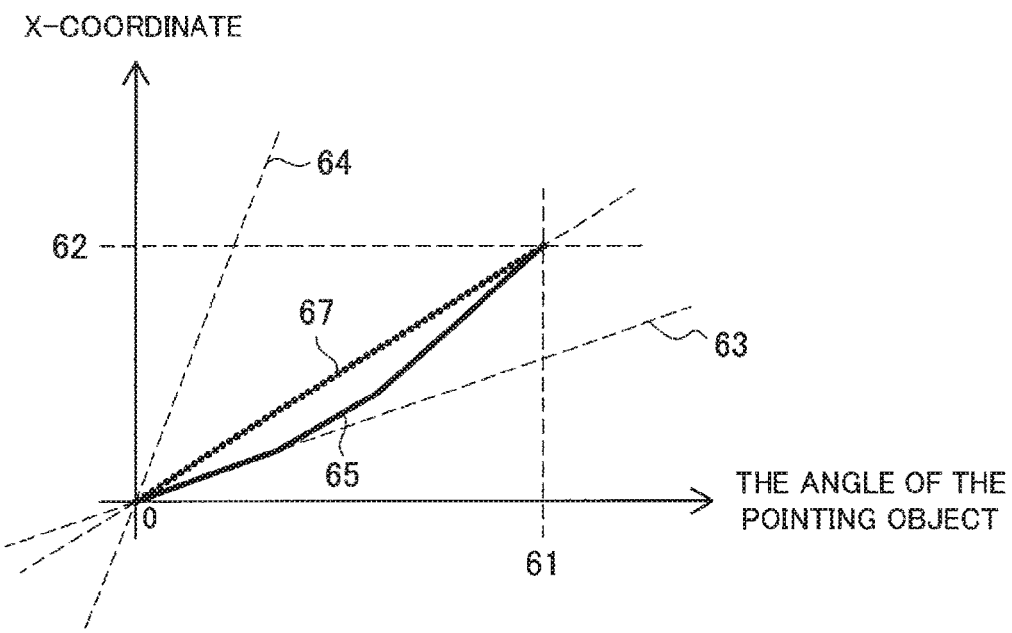
FIG. 8 is an explanatory diagram for explaining display control processing according to a second example.

FIG. 8 is an explanatory diagram for explaining the display control processing according to the second example. More specifically, FIG. 8 is a diagram illustrating another example of an offset corresponding to the distance L. The horizontal axis indicates the angle of the pointing object 20 in the case where the angle in the case where the pointing object 20 points the reference point 54 is set at 0. The vertical axis indicates the X coordinate on the display region 50 in the case where the X coordinate of the reference point 54 is set at 0. The processing in the case where the distance L is short is as described above with reference to FIG. 8.

A reference numeral 67 indicates the display coordinate corresponding to the angle of the pointing object 20 in the case where the distance L is long. A distance between the reference numeral 64 and the reference numeral 67 in the vertical axis direction at the same angle indicates a length of the offset. As illustrated in FIG. 8, even near the reference point 54, an offset is added. Further, an offset is uniformly added both in the case where the angle is small and in the case where the angle is large. Such uniform addition of an offset enables the user to achieve constant operational feeling.

3.3. Third Example

The present example is an example where, in the case where the user is not located at the center in front of the display region 50, an offset in accordance with displacement from the center is added.

Figure 9:
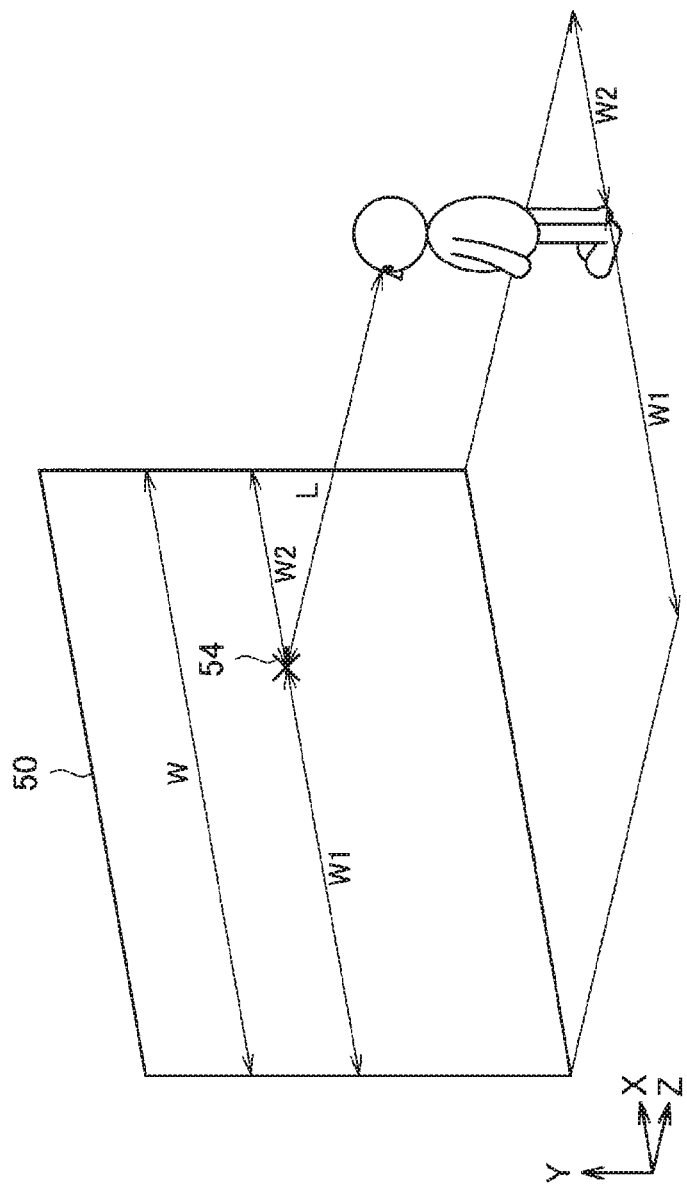
FIG. 9 is an explanatory diagram for explaining display control processing according to a third example.

FIG. 9 is an explanatory diagram for explaining display control processing according to the third example. As illustrated in FIG. 9, a distance from the reference point 54 (for example, a front point of the user) to one end portion of the display region 50 is set as W1, and a distance to the other end portion is set as W2. The distance W1 is larger than the distance W2. In the case where the user is not located at the center of the display region 50 in this manner, the display control apparatus 10 adds an asymmetric offset between in the case where the original coordinate is located on the end portion side closer from the reference point 54 and in the case where the original coordinate is located on the end portion side farther from the reference point 54. A specific control example of relationship between the original coordinate and the display coordinate will be described below with reference to FIG. 10.

Figure 10:
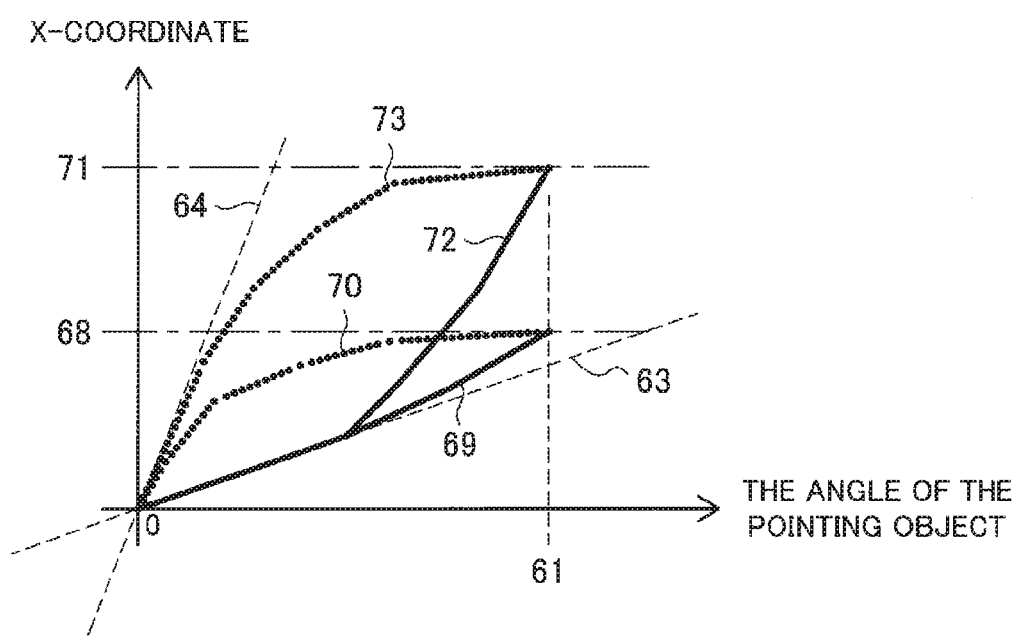
FIG. 10 is an explanatory diagram for explaining display control processing according to a third example.

FIG. 10 is an explanatory diagram for explaining the display control processing according to the third example. More specifically, FIG. 10 is a diagram illustrating an example of an offset corresponding to the distance L, and the distance W1 and the distance W2. The horizontal axis indicates the angle of the pointing object 20 in the case where the angle in the case where the pointing object 20 points the reference point 54 is set at 0. The vertical axis indicates the X coordinate on the display region 50 in the case where the X coordinate of the reference point 54 is set at 0.

First, a case where the original coordinate is located on the end portion side closer from the reference point 54 will be described. A reference numeral 68 is a coordinate (that is, W2) of the end portion closer from the reference point 54 among the upper limit of the display region 50 in the X axis direction. A reference numeral 69 indicates the display coordinate corresponding to the angle of the pointing object 20 in the case where the distance L is short. Then, a distance between the reference numeral 63 and the reference numeral 69 in the vertical axis direction at the same angle indicates a length of the offset. Further, a reference numeral 70 indicates the display coordinate corresponding to the angle of the pointing object 20 in the case where the distance L is long. Then, a distance between the reference numeral 64 and the reference numeral 70 in the vertical axis direction at the same angle indicates a length of the offset.

Subsequently, a case where the original coordinate is located on the end portion side farther from the reference point 54 will be described. A reference numeral 71 is a coordinate (that is W1) of the end portion farther from the reference point 54 among upper limits of the display region 50 in the X axis direction. Note that, while, originally, positive and negative signs of the reference numeral 68 and the reference numeral 71 should be inverse, here, the both signs are set at positive to simplify the explanation. A reference numeral 72 indicates the display coordinate corresponding to the angle of the pointing object 20 in the case where the distance L is short. Then, a distance between the reference numeral 63 and the reference numeral 72 in the vertical axis direction at the same angle indicates a length of the offset. Further, a reference numeral 73 indicates the display coordinate corresponding to the angle of the pointing object 20 in the case where the distance L is long. Then, a distance between the reference numeral 64 and the reference numeral 73 in the vertical axis direction at the same angle indicates a length of the offset.

If the display coordinate (reference numeral 69) in the case where the original coordinate is located on the end portion side closer from the reference point 54 is compared with the display coordinate (reference numeral 72) in the case where the original coordinate is located on the end portion side farther from the reference point 54 in the case where the distance L is short (that is, the distance L is shorter than the threshold), the length of the offset is longer in the latter case than in the former case. That is, the display control apparatus 10 makes the relative distance from the original coordinate to the display coordinate larger in the case where the original coordinate is located on the end portion side farther from the reference point 54 among the end portions of the display region 50 than in the case where the original coordinate is located on the end portion side closer from the reference point 54 in the case where the distance L is shorter than the threshold.

If the display coordinate (reference numeral 70) in the case where the original coordinate is located on the end portion side closer from the reference point 54 is compared with the display coordinate (reference numeral 73) in the case where the original coordinate is located on the end portion side farther from the reference point 54 in the case where the distance L is long (that is, the distance L is longer than the threshold), the length of the offset is longer in the former case than in the latter case. That is, the display control apparatus 10 makes the relative distance from the original coordinate to the display coordinate larger in the case where the original coordinate is located on the end portion side closer from the reference point 54 among the end portions of the display region 50 than in the case where the original coordinate is located on the end portion side farther from the reference point 54 in the case where the distance L is longer than the threshold.

With such processing, even in the case where the user is not located at the center in front of the display region 50, the user can point the whole display region 50 using the pointer 52 through operation which is in accordance with the position of himself/herself and which is not unnatural.

3.4. Fourth Example

The present example is an example where the user is not located in front of the display region 50.

Figure 11:
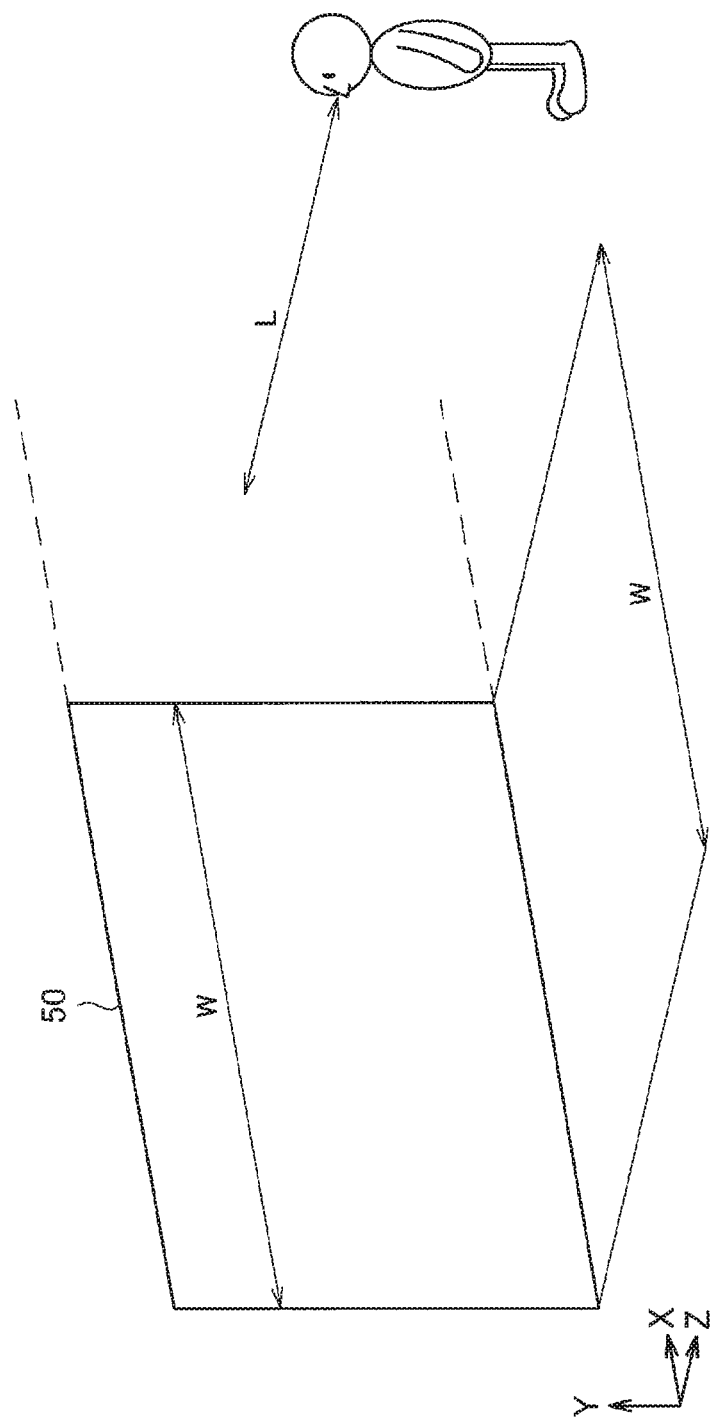
FIG. 11 is an explanatory diagram for explaining display control processing according to a fourth example.

FIG. 11 is an explanatory diagram for explaining display control processing according to the fourth example. As illustrated in FIG. 11, the user is not located in front of the display region 50 and a front point of the user is located outside the display region 50. In this case, as will be described below, display control in accordance with the angle of the pointing object 20 can be performed.

Figure 12:
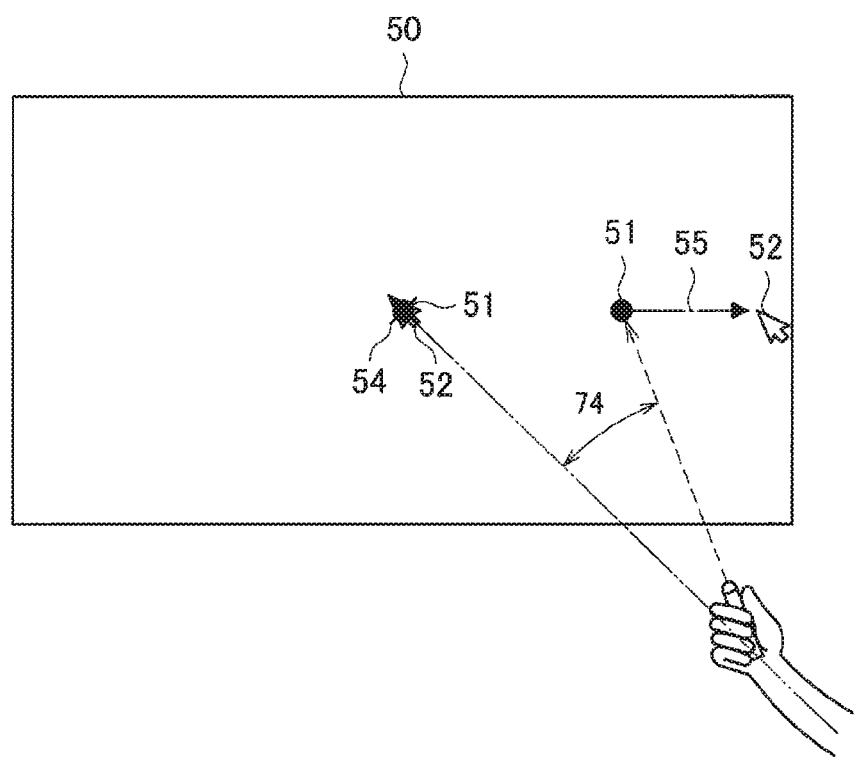
FIG. 12 is an explanatory diagram for explaining display control processing according to a fourth example.

FIG. 12 is an explanatory diagram for explaining the display control processing according to the fourth example. As illustrated in FIG. 12, it is assumed that the reference point 54 is an arbitrary point (for example, a center point) in the display region 50. Then, the display control apparatus 10 recognizes that the pointed point 51 is located at a position in accordance with an angle (reference numeral 74) between the forearm portion of the user who grasps the pointing object 20 and the pointing object 20. For example, in the case where the angle (reference numeral 74) between the forearm portion and the pointing object 20 is 0, it is recognized that the pointed point 51 is located at the reference point 54. Further, in the case where the angle (reference numeral 74) between the forearm portion and the pointing object 20 is not 0, it is recognized that the pointed point 51 is located at a position displaced from the reference point 54 by an amount corresponding to the angle. Note that, while FIG. 12 illustrates the reference point 54 located on a direction that the forearm portion of the user points, the reference point 54 may be located at a displaced position. As illustrated in FIG. 12, in the case where the pointed point 51 is located at the reference point 54, the pointed point 51 matches the pointer 52 (that is, there is no offset), while, in the case where the pointed point 51 is displaced, a long offset 55 is added to the pointed point 51. This offset can be controlled in a similar manner to the examples described above with reference to, for example, FIG. 7, FIG. 8 or FIG. 10.

3.5. Fifth Example

The present example is an example where an offset in which the attitude of the user is taken into account is added.

FIG. 13 is an explanatory diagram for explaining display control processing according to the fifth example. As illustrated in FIG. 13, in the case where the user faces the front with respect to the display region 50 (that is, a direction that the user faces becomes a vertical line to the display region 50), a point 56 on a direction that the user faces (in the present example, this point will be referred to as a reference point) matches the front point 57. Meanwhile, in the case where the user faces obliquely with respect to the display region 50 (that is, a direction that the user faces does not become the vertical line to the display region 50), the reference point 56 does not match the front point 57. In the both cases, the display control apparatus 10 adds an asymmetric offset. In this event, the display control apparatus 10 controls relationship between the original coordinate and the display coordinate further on the basis of the attitude of the user. By this means, the user can point the whole display region 50 using the pointer 52 through operation which is in accordance with the attitude of himself/herself and which is not unnatural. A specific control example of the relationship between the original coordinate and the display coordinate will be described below with reference to FIG. 14. Note that a case where the distance L is shorter than the threshold will be described using FIG. 14.

Figure 14:
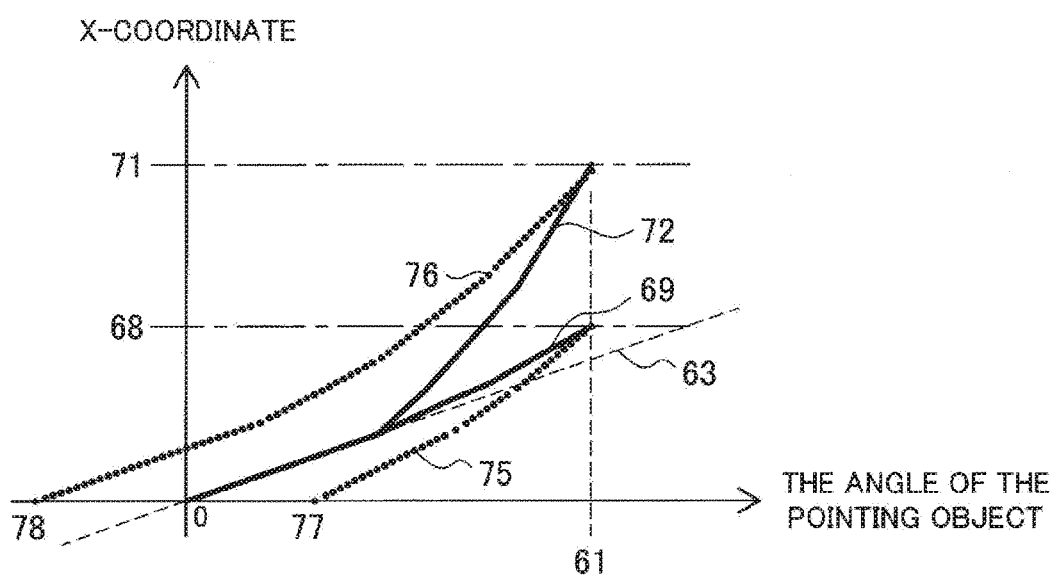
FIG. 14 is an explanatory diagram for explaining display control processing according to a fifth example.

FIG. 14 is an explanatory diagram for explaining the display control processing according to the fifth example. The horizontal axis indicates the angle of the pointing object 20 in the case where the angle in the case where the pointing object 20 points the reference point 56 is set at 0. The vertical axis indicates the X coordinate on the display region 50 in the case where the X coordinate of the front point 57 is set at 0. The reference numeral 69 and the reference numeral 72 indicate the display coordinate corresponding to the angle of the pointing object 20 in the case where the reference point 56 matches the front point 57, which has been described in detail above with reference to FIG. 10. Meanwhile, the reference numeral 75 and the reference numeral 76 indicate the display coordinate corresponding to the angle of the pointing object 20 in the case where the reference point 56 does not match the front point 57. The reference numeral 75 indicates the display coordinate corresponding to the angle of the pointing object 20 in the case where the original coordinate is located on the end portion side closer from the front point 57. Note that an intercept 77 indicates that the pointing object 20 points the front point 57. The reference numeral 76 indicates the display coordinate corresponding to the angle of the pointing object 20 in the case where the original coordinate is located on the end portion side farther from the front point 57. Note that an intercept 78 indicates that the pointing object 20 points the front point 57.

3.6. Sixth Example

The present example is a form in which acceleration relating to movement of the pointer 52 is controlled in accordance with movement of the pointed point 51.

Figure 15:
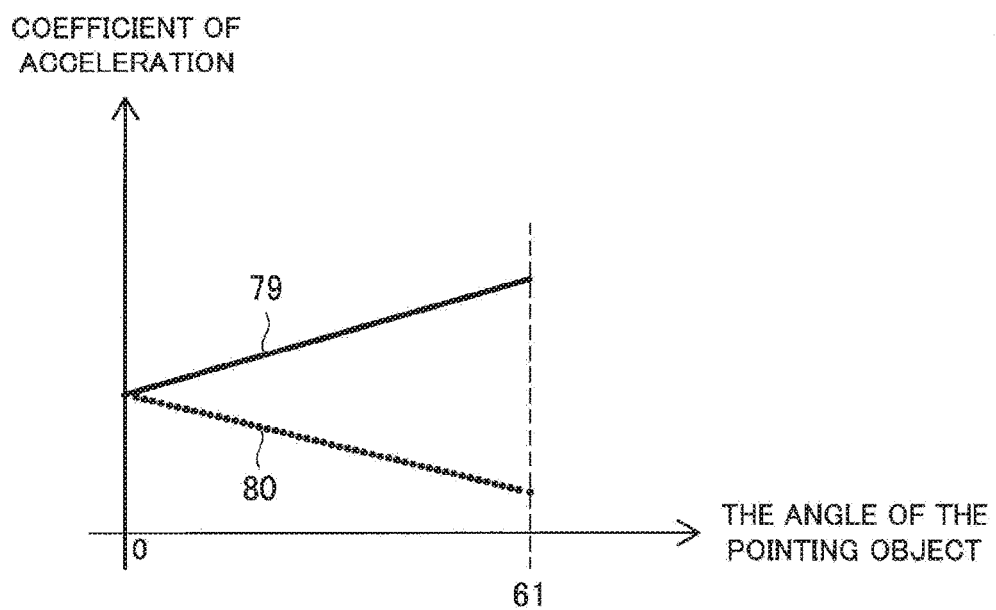
FIG. 15 is an explanatory diagram for explaining display control processing according to a sixth example.

FIG. 15 is an explanatory diagram for explaining display control processing according to the sixth example. The horizontal axis indicates the angle of the pointing object 20 in the case where the angle in the case where the pointing object 20 points the reference point 54 (for example, the front point of the user) is set at 0. The vertical axis is a value of a coefficient for calculating acceleration. The display control apparatus 10 controls relative acceleration of the display coordinate with respect to acceleration of the original coordinate using this coefficient. For example, a product of default acceleration and this coefficient becomes adjusted acceleration. A reference numeral 79 indicates a coefficient corresponding to the angle of the pointing object 20 in the case where the distance L is short. A reference numeral 80 indicates a coefficient corresponding to the angle of the pointing object 20 in the case where the distance L is long. That is, in the case where the distance L is short, the relative acceleration is increased as the reference point 54 is farther from the original coordinate, while, in the case where the distance L is long, the relative acceleration is reduced as the original coordinate is farther from the reference point 54. For a reason similar to the reason why control in accordance with the distance L of the relative distance from the original coordinate to the display coordinate improves operational feeling of the user, described above with reference to FIG. 7, it is possible to improve operational feeling of the user through such control of relative acceleration.

3.7. Seventh Example

The present example is a form which enables switching of an operation mode between a normal operation mode for rough pointer operation and a detailed operation mode for minute pointer operation. In other words, the present example is a form in which the display control apparatus 10 (display control unit 143) switches whether the relationship between the original coordinate and the display coordinate is made fixed or made variable.

Figure 16:
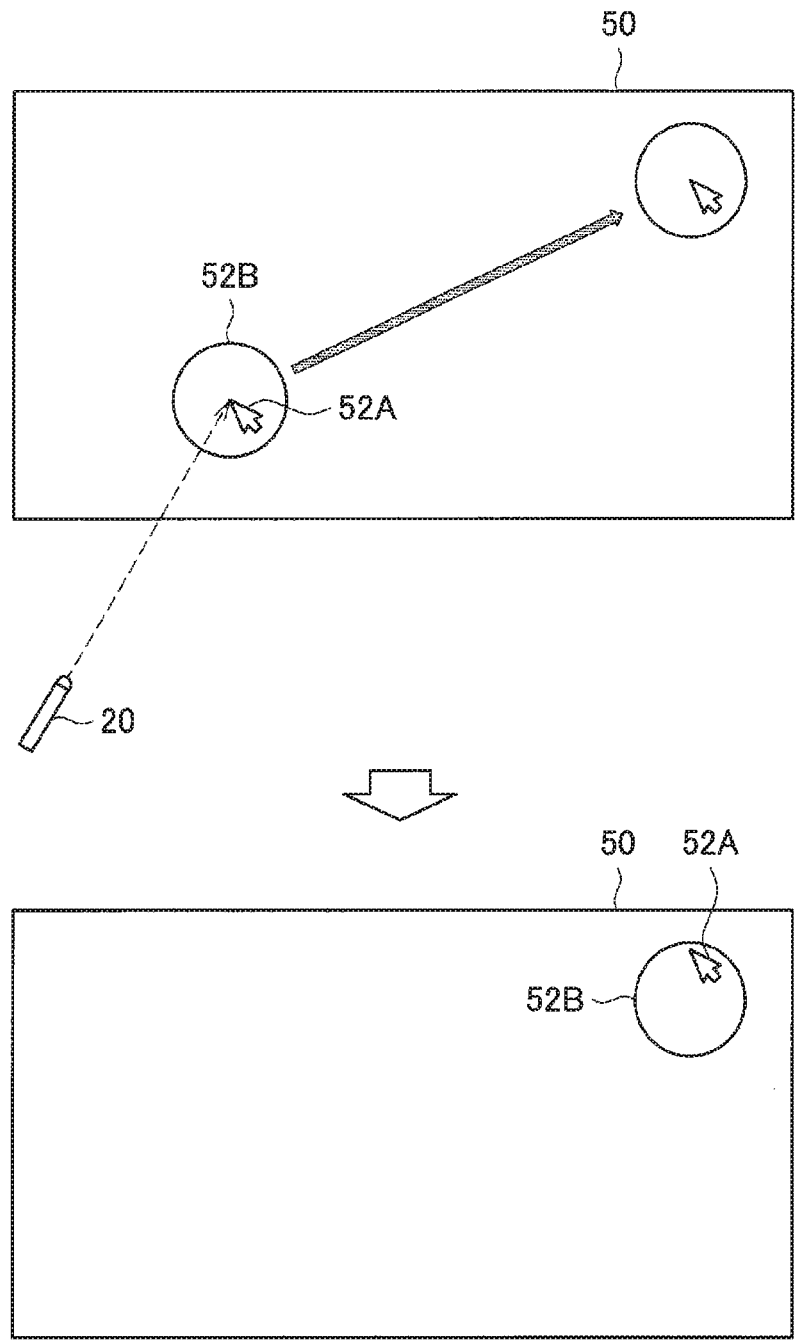
FIG. 16 is an explanatory diagram for explaining display control processing according to a seventh example.

FIG. 16 is an explanatory diagram for explaining display control processing according to the seventh example. More specifically, an upper part of FIG. 16 is a diagram illustrating operation in the normal operation mode. In the normal operation mode, the display control apparatus 10 displays a pointer 52A and a pointer 52B as display objects corresponding to the pointing object 20. The pointer 52B is display indicating that the pointer 52A operates within the frame. In the normal operation mode, the pointer 52A coordinates with the pointer 52B. Here, the display control apparatus 10 controls the relationship between the original coordinate and the display coordinate in a variable manner as described in, for example, the above-described first example, or the like, in the normal operation mode. By this means, the user can point the whole display region 50 using the pointers 52A and 52B with a small operation amount.

Meanwhile, a lower part of FIG. 16 is a diagram illustrating operation in the detailed operation mode. Also in the detailed operation mode, the display control apparatus 10 displays the pointer 52A and the pointer 52B as the display objects corresponding to the pointing object 20. However, the display control apparatus 10 fixes the pointer 52B and moves the pointer 52A inside the pointer 52B. In this event, the display control apparatus 10 fixes the relationship between the original coordinate and the pointer 52A. By this means, the user can minutely operate the pointer 52A. Note that as an example of fixing, the display control apparatus 10 may make the original coordinate match the display coordinate. Further, the display control apparatus 10 may move the pointer 52B in a direction away from the pointer 52A when the pointer 52A approaches the frame of the pointer 52B. By this means, it is possible to prevent an operation range from being limited in the detailed operation mode.

While, in the normal operation mode, the pointer 52A is fixed at the center, or the like, of the frame of the pointer 52B, in the detailed operation mode, the pointer 52A is not fixed and only the pointer 52A moves. By this means, the user can know change of the operation mode. Further, the display control apparatus 10 may change contrast of the pointers 52A and 52B (for example, reverse density of color) between in the normal operation mode and in the detailed operation mode. Also by this means, the user can know change of the operation mode.

3.8. Supplementary Note (1) Control of Relationship Between Original Coordinate and Display Coordinate on the Basis of Other Factors The display control apparatus 10 can control the relationship between the original coordinate and the display coordinate on the basis of a wide variety of information other than the above-described information.

For example, the display control apparatus 10 can control the relationship between the original coordinate and the display coordinate further on the basis of profile information of the user. Specifically, because a range of motion of joints can change in accordance with age, the display control apparatus 10 can expand or narrow a movable range 53 in accordance with the age of the user. Further, because height of the point of view can change in accordance with body height of the user, the display control apparatus 10 can expand or narrow the movable range 53 in accordance with the body height of the user. Further, the display control apparatus 10 may control the relationship between the original coordinate and the display coordinate on the basis of a point of gaze of the user, a behavior recognition result, moving speed, biological information (such as a heart rate, a body temperature, perspiration, a blood pressure, perspiration, pulse, breathing, palpebration, eyeball movement, a gazing period, a size of a pupil diameter, a blood pressure, a brain wave, body motion, a body position, a cutaneous temperature, electrical skin resistance, micro vibration (MV), myopotential and a blood oxygen saturation level ($SPO_2$)), a feeling estimation result (delight, anger, sorrow and pleasure), or the like.

For example, the display control apparatus 10 can control the relationship between the original coordinate and the display coordinate further on the basis of information of a device. Examples of the information of the device can include, for example, a state of the display region 50. Examples of the state of the display region 50 can include a size, an aspect ratio, shape, or the like, of the display region 50, because there is a case where the display region 50 is curved or there is concavity and convexity. Further, examples of the information of the device can include whether the pointing object 20 is an apparatus such as a laser pointer or the finger, or the like, of the user. Further, examples of the information of the device can include a distance between a position of the user (for example, a position of the center of gravity) and a position of the pointing object 20. Further, the display control apparatus 10 may control the relationship between the original coordinate and the display coordinate on the basis of device attribute (an HMD, a TV, a smartphone), display resolution, a display scheme, an HMD scheme, whether or not there is a sensor, an ID, a remaining battery level, battery capacity, whether or not charging is being performed, processing load of a CPU, a temperature of a CPU, whether or not there is a slot for an external storage medium, a communication scheme, acoustic characteristics, characteristics of an imager, 3D shooting capability, 3D display capability, attitude of the device, a state where a wearable device is worn (worn, not worn, a position where the device is worn), a position of the device (if the device is a wearable device, a position where the device is worn), or the like.

For example, the display control apparatus 10 can control the relationship between the original coordinate and the display coordinate further on the basis of information of content. Examples of the information of the content can include, for example, whether the pointer 52 points a region such as an icon or points a pinpoint. Further, examples of the information of the content can include, for example, whether content requires only rough pointing or requires minute pointing. Further, the display control apparatus 10 may control the relationship between the original coordinate and the display coordinate on the basis of a display size of the content, a display position, attitude of display, an animation state of display (moving speed, a moving direction, trajectory, frequency of updating), attribute of the content (a type, a degree of importance, priority, a type of application (browser, map, mailer, IME, SNS)), resolution, color, a use mode, or the like.

Further, the display control apparatus 10 may control the relationship between the original coordinate and the display coordinate further on the basis of environmental information. For example, the display control apparatus 10 may control the relationship between the original coordinate and the display coordinate on the basis of background (important information, background color), illuminance, location (indoor, outside, situation (geo-fence), under water, atmosphere), action history (whether located at a familiar location), circumstances (whether or not there are other persons, cars, or the like, density), time, altitude, a temperature, a direction of wind, an air volume, or the like.

Here, offset setting (that is, various kinds of setting relating to control of the relationship between the original coordinate and the display coordinate, such as the threshold of the distance L, a length of the offset to be added and a direction) can be changed by being triggered by a wide variety of factors. For example, in the case where there is change in the above-described profile information, information of the device, information of the content or environmental information, the display control apparatus 10 can change offset setting. Further, in the case where positional relationship between the user and the display region 50 changes, and, in the case where positional relationship between a position of a point of view of the user and the display region 50 changes, the display control apparatus 10 can change offset setting.

(2) Exception Processing

Further, the display control apparatus 10 may perform exception processing. For example, the display control apparatus 10 may make the original coordinate match the display coordinate, that is, make an offset zero upon occurrence of exception while controlling the relationship between the original coordinate and the display coordinate in a variable manner in a normal state as described above. For example, in the case where the distance L becomes shorter than the threshold, the display control apparatus 10 makes the offset zero. Further, the display control apparatus 10 may make the offset zero in the case where the user performs operation of writing characters or drawing a picture using the pointer 52. Still further, the display control apparatus 10 may make the offset zero in the case where the user holds a specific pose, for example, using the whole portion from the forearm to the fingertip, or in the case where a direction of the line of sight of the user matches a direction that the pointing object 20 points.

(3) Calibration

Figure 17:
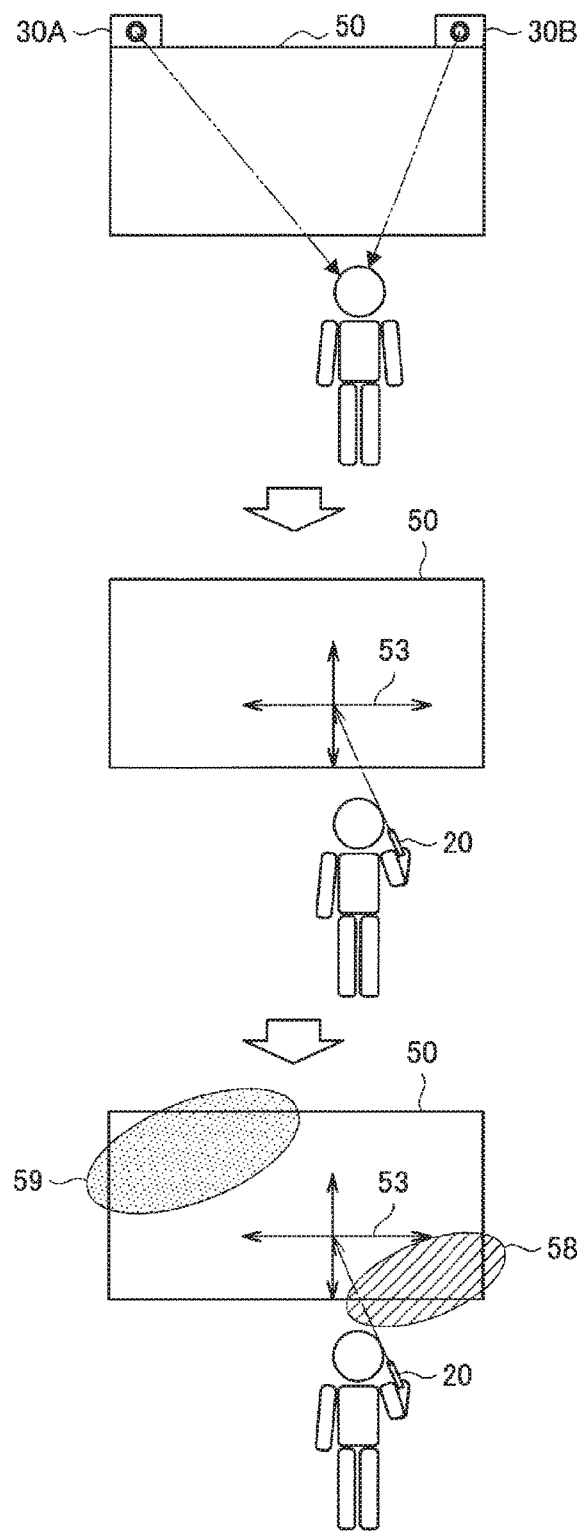
FIG. 17 is an explanatory diagram for explaining calibration by the display control apparatus according to the embodiment.

Subsequently, calibration will be described with reference to FIG. 17. FIG. 17 is an explanatory diagram for explaining calibration by the display control apparatus 10 according to the present embodiment.

First, the display control apparatus 10 (for example, the detecting unit 141) detects positional relationship between the display region 50 and the user on the basis of captured images by imaging apparatuses 30A and 30B. The imaging apparatuses 30A and 30B may form a stereo camera.

Subsequently, the display control apparatus 10 (for example, the display control unit 143) accepts setting of the movable range 53 by the user. The display control apparatus 10 may further accept setting of acceleration.

Through such calibration, the display control apparatus 10 (the display control unit 143) can control the relationship between the original coordinate and the display coordinate in accordance with setting by the user. For example, in a region 58, a relative distance between the original coordinate and the display coordinate becomes short, and, in a region 59, the relative distance between the original coordinate and the display coordinate becomes long.

4. HARDWARE CONFIGURATION EXAMPLE

Figure 18:
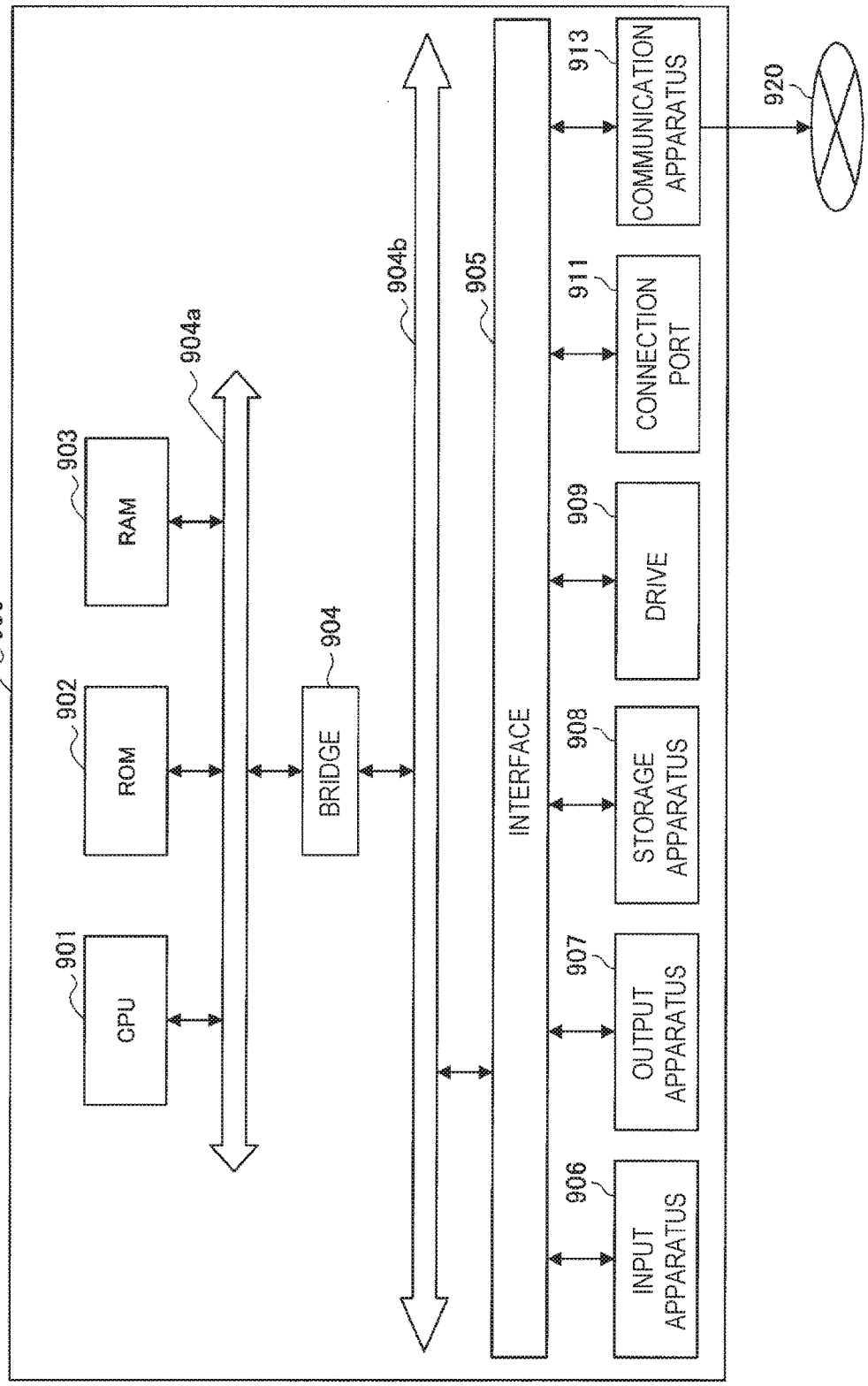
FIG. 18 is a block diagram illustrating an example of a hardware configuration of an information processing apparatus according to the embodiment.

Lastly, the hardware configuration of an information processing apparatus according to the present embodiment will be described with reference to FIG. 18. FIG. 18 is a block diagram illustrating an example of the hardware configuration of the information processing apparatus according to the present embodiment. Note that an information processing apparatus 900 illustrated in FIG. 18 can implement, for example, the display control apparatus 10 illustrated in FIG. 3. Information processing performed by the display control apparatus 10 according to the present embodiment is implemented in cooperation between software and hardware described below.

As illustrated in FIG. 18, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input apparatus 906, an output apparatus 907, a storage apparatus 908, a drive 909, a connection port 911, and a communication apparatus 913. The information processing apparatus 900 may include a processing circuit such as a DSP or an ASIC instead of or in combination with the CPU 901.

The CPU 901 functions as a processing apparatus and a control apparatus, and controls the overall operation of the information processing apparatus 900 in accordance with a variety of programs. In addition, the CPU 901 may be a microprocessor. The ROM 902 stores programs, operation parameters, and the like that the CPU 901 uses. The RAM 903 temporarily stores programs used in the execution of the CPU 901 and the parameters and the like that appropriately changes during the execution. The CPU 901 can form, for example, the processing unit 140 illustrated in FIG. 3.

The CPU 901, the ROM 902, and the RAM 903 are connected to each other by the host bus 904a including a CPU bus, or the like. The host bus 904a is connected to the external bus 904b such as a peripheral component interconnect/interface (PCI) bus through the bridge 904. Note that the host bus 904a, the bridge 904, and the external bus 904b are not necessarily configured as different components but the functions thereof may be implemented in a single bus.

The input apparatus 906 is implemented, for example, by an apparatus such as a mouse, a keyboard, a touch panel, a button, a microphone, a switch, and a lever into which a user inputs information. In addition, the input apparatus 906 may be, for example, a remote control apparatus using infrared light or other radio waves, or may be an external connection apparatus such as a mobile phone and a PDA operable in response to the operation of the information processing apparatus 900. Further, the input apparatus 906 may include, for example, an input control circuit or the like that generates an input signal on the basis of information input by a user using the above-described input means, and outputs the input signal to the CPU 901. A user of the information processing apparatus 900 is able to input a variety of data to the information processing apparatus 900 and instruct the information processing apparatus 900 to perform a processing operation by operating this input apparatus 906.

The output apparatus 907 includes an apparatus capable of visually or aurally notifying a user of acquired information. Such an apparatus includes a display apparatus such as a CRT display apparatus, a liquid crystal display apparatus, a plasma display apparatus, an EL display apparatus, a laser projector, an LED projector and a lamp, a sound output apparatus such as a speaker and a headphone, a printer apparatus, and the like. The output apparatus 907 outputs, for example, results obtained from various types of processing performed by the information processing apparatus 900. Specifically, the display apparatus visually displays results obtained from various types of processing performed by the information processing apparatus 900 in a variety of forms such as text, an image, a table, and a graph. Meanwhile, the sound output apparatus converts audio signals including reproduced audio data, acoustic data, or the like into analog signals, and aurally outputs the analog signals.

The storage apparatus 908 is an apparatus for data storage which is configured as an example of a storage unit of the information processing apparatus 900. The storage apparatus 908 is implemented, for example, by a magnetic storage apparatus such as a HDD, a semiconductor storage device, an optical storage device, a magneto-optical storage device, or the like. The storage apparatus 908 may include a recording medium, a recording apparatus that records data in the recording medium, a readout apparatus that reads out data from the recording medium, a deletion apparatus that deletes data recoded in the recording medium, and the like. This storage apparatus 908 stores a program to be executed by the CPU 901, various kinds of data, various kinds of data acquired from the outside, and the like. The storage apparatus 908 can form, for example, the storage unit 130 illustrated in FIG. 3.

The drive 909 is a reader/writer for a storage medium, and is built in or externally attached to the information processing apparatus 900. The drive 909 reads out information recorded on a removable storage medium such as a mounted magnetic disk, optical disc, magneto-optical disk, or semiconductor memory, and outputs the read-out information to the RAM 903. In addition, the drive 909 is also capable of writing information into a removable storage medium.

The connection port 911 is an interface connected to an external apparatus and is a port for connecting an external apparatus that is capable of data transmission through, for example, a universal serial bus (USB). The connection port 911 can form, for example, the input/output unit 120 illustrated in FIG. 3.

The communication apparatus 913 is, for example, a communication interface including a communication device and the like for a connection to a network 920. The communication apparatus 913 may be, for example, a communication card, and the like for a wired or wireless local area network (LAN), Long Term Evolution (LTE), Bluetooth (registered trademark), or a wireless USB (WUSB), or the like. In addition, the communication apparatus 913 may be a router for optical communication, a router for an asymmetric digital subscriber line (ADSL), a modem for various kinds of communication, or the like. This communication apparatus 913 is capable of transmitting and receiving signals or the like, for example, to and from the Internet or other communication apparatuses in compliance with a predetermined protocol such as TCP/IP. The communication apparatus 913 can form, for example, the wireless communication unit 110 illustrated in FIG. 3.

Note that the network 920 is a wired or wireless transmission path through which information is transmitted from an apparatus connected to the network 920. The network 920 may include public networks such as the Internet, telephone networks and satellite networks, a variety of local area networks (LANs) including Ethernet (registered trademark), and wide area networks (WANs). In addition, the network 920 may also include leased line networks such as Internet protocol-virtual private networks (IP-VPNs).

The example of a hardware configuration that is capable of implementing the functions of the information processing apparatus 900 according to the present embodiment has been described above. Each of the above-described components may be implemented with a general-purpose member, and may also be implemented with hardware specialized in the function of each component. Thus, it is possible to modify the hardware configuration used as appropriate in accordance with the technological level at the time of the implementation of the present embodiment.

Note that it is possible to create a computer program for implementing each function of the information processing apparatus 900 according to the above-described embodiment, and implement the computer program in a PC or the like. It addition, it is also possible to provide a computer-readable recording medium having such a computer program stored therein. Examples of the recording medium include a magnetic disk, an optical disc, a magneto-optical disk, and a flash memory. In addition, the computer program may also be distributed via a network, for example, using no recording medium.

5. CONCLUSION

An embodiment of the present disclosure has been described in detail above with reference to FIG. 1 to FIG. 18. As described above, the display control apparatus 10 according to the present embodiment controls the relationship between the original coordinate and the display coordinate at which the display object corresponding to the pointing object 20 is to be displayed on the basis of positional relationship between the user and the display region 50, and the original coordinate on the display region 50 pointed by the pointing object 20 of the user. By this means, it is possible to further improve operational feeling of the pointing operation. More specifically, the user can point the whole display region 50 using the pointer 52 through operation which is in accordance with positional relationship with the display region 50 and which is not unnatural.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, each of the apparatuses described in the present specification may be implemented as a single apparatus, or part or all of the apparatuses may be implemented as separate apparatuses. For example, in the functional configuration example of the display control apparatus 10 illustrated in FIG. 3, the storage unit 130 and the processing unit 140 may be provided at an apparatus such as a server connected to the wireless communication unit 110 and the input/output unit 120 via a network, or the like. Further, the display control apparatus 10, the imaging apparatus 30, the display apparatus 40 and the display region 50 may be integrally formed.

Further, while a case has been described above where the relationship between the original coordinate and the display coordinate is controlled in relationship with the whole display region 50, the present technology is not limited to such an example. For example, the relationship between the original coordinate and the display coordinate may be controlled in relationship with an application window. Specifically, the whole application window may be pointed with the pointer 52 through operation of the original coordinate within a range narrower than the application window.

Further, the above-described respective examples can be combined as appropriate.

The processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control unit configured to, on a basis of positional relationship between a user and a display region and a first coordinate on the display region pointed by a pointing object of the user, control relationship between the first coordinate and a second coordinate at which a display object corresponding to the pointing object is to be displayed.

(2)

The information processing apparatus according to (1), in which the control unit increases a relative distance between the first coordinate and the second coordinate as a distance from a reference point based on the positional relationship to the first coordinate increases.

(3)

The information processing apparatus according to (2), in which the positional relationship includes a distance from the display region to the user.

(4)

The information processing apparatus according to (3), in which, in a case where the distance is shorter than a threshold, the control unit causes the second coordinate to be disposed on a side opposite to a side of the reference point on a basis of the first coordinate.

(5)

The information processing apparatus according to (3) or (4), in which, in a case where the distance is shorter than a threshold and the first coordinate is located on an end portion side farther from the reference point among end portions of the display region, the control unit increases the relative distance compared to a case where the first coordinate is located on an end portion side closer to the reference point.

(6)

The information processing apparatus according to any one of (3) to (5), in which, in a case where the distance is longer than a threshold, the control unit causes the second coordinate to be disposed on a same side as a side of the reference point on a basis of the first coordinate.

(7)

The information processing apparatus according to (6), in which, in a case where the distance is longer than a threshold and the first coordinate is located on an end portion side closer to the reference point among end portions of the display region, the control unit increases the relative distance compared to a case where the first coordinate is located on an end portion side farther from the reference point.

(8)

The information processing apparatus according to any one of (1) to (7), in which the control unit controls the relationship further on a basis of setting of a movable range of the first coordinate.

(9)

The information processing apparatus according to (8), in which the control unit increases a relative distance between the first coordinate and the second coordinate as the first coordinate approaches an end portion of the movable range.

(10)

The information processing apparatus according to (8) or (9), in which the control unit makes a maximum value of a relative distance between the first coordinate and the second coordinate larger as the movable range shrinks.

(11)

The information processing apparatus according to any one of (1) to (10), in which the control unit controls the relationship further on a basis of profile information of the user.

(12)

The information processing apparatus according to any one of (1) to (11), in which the control unit controls the relationship further on a basis of a state of the display region.

(13)

The information processing apparatus according to (12), in which the control unit controls the relationship further on a basis of a size of the display region.

(14)

The information processing apparatus according to (12), in which the control unit controls the relationship further on a basis of a shape of the display region.

(15)

The information processing apparatus according to any one of (1) to (14), in which the control unit controls the relationship further on a basis of information of content.

(16)

The information processing apparatus according to any one of (1) to (15), in which the control unit switches whether to make the relationship fixed or variable.

(17)

The information processing apparatus according to any one of (1) to (16), in which the control unit controls relative acceleration of the second coordinate with respect to acceleration of the first coordinate.

(18)

The information processing apparatus according to any one of (1) to (17), in which the control unit controls the relationship further on a basis of an attitude of the user.

(19)

An information processing method including:

on a basis of positional relationship between a user and a display region and a first coordinate on the display region pointed by a pointing object of the user, causing a processor to control relationship between the first coordinate and a second coordinate at which a display object corresponding to the pointing object is to be displayed.

(20)

A program for causing a computer to function as a control unit configured to, on a basis of positional relationship between a user and a display region and a first coordinate on the display region pointed by a pointing object of the user, control relationship between the first coordinate and a second coordinate at which a display object corresponding to the pointing object is to be displayed.

REFERENCE SIGNS LIST 1 display control system
10 display control apparatus
20 pointing object
30 imaging apparatus
40 display apparatus
50 display region
51 pointed point
52 pointer
53 movable range
54 reference point
55 offset
110 wireless communication unit
120 input/output unit
130 storage unit
140 processing unit
141 detecting unit
143 display control unit

The invention claimed is:

1. An information processing apparatus, comprising:
  circuitry configured to:
    control a relationship between a first coordinate on a display region, and a second coordinate at which a display object corresponding to a pointing object is displayed on the display region, wherein
    the first coordinate is pointed by the pointing object,
    the relationship between the first coordinate and the second coordinate is based on a positional relationship between a first distance from the display region to the pointing object;
increase a relative distance between the first coordinate and the second coordinate as a second distance between a reference point and the first coordinate increases, wherein the reference point is set based on the positional relationship;
wherein, based on the first distance being shorter than a threshold, the circuitry is further configured to dispose the second coordinate on a side opposite to a side of the reference point; and
wherein, based on the first distance being longer than the threshold, the circuitry is further configured to dispose the second coordinate on a same side as the side of the reference point.

2. The information processing apparatus according to claim 1,
wherein, when the first distance is shorter than the threshold and the first coordinate is located on a side of an end portion that is farther from the reference point among end portions of the display region, the circuitry is further configured to increase the relative distance between the first coordinate and the second coordinate compared to when the first coordinate is located on a side of one of the end portions located closer to the reference point.

3. The information processing apparatus according to claim 1,
wherein, when the first distance is longer than the threshold and the first coordinate is located on a side of an end portion that is closer to the reference point among end portions of the display region, the circuitry is further configured to increase the relative distance between the first coordinate and the second coordinate compared to when the first coordinate is located on a side of one of the end portions located farther from the reference point.

4. The information processing apparatus according to claim 1,
wherein the circuitry is further configured to control the relationship between the first coordinate and the second coordinate further based on an adjustable range of the first coordinate that is set, wherein the adjustable range is smaller than a size of the display region.

5. The information processing apparatus according to claim 4,
wherein the circuitry is further configured to increase the relative distance between the first coordinate and the second coordinate as the first coordinate approaches an end portion of the adjustable range.

6. The information processing apparatus according to claim 4,
wherein the circuitry is further configured to attain a maximum value of the relative distance between the first coordinate and the second coordinate as the adjustable range shrinks.

7. The information processing apparatus according to claim 1,
wherein the circuitry is further configured to control the relationship between the first coordinate and the second coordinate further based on profile information of a user of the pointing object.

8. The information processing apparatus according to claim 1,
wherein the circuitry is further configured to control the relationship between the first coordinate and the second coordinate further based on an operational state of the display region.

9. The information processing apparatus according to claim 8,
wherein the circuitry is further configured to control the relationship between the first coordinate and the second coordinate further based on a size of the display region.

10. The information processing apparatus according to claim 8,
wherein the circuitry is further configured to control the relationship between the first coordinate and the second coordinate further based on a shape of the display region.

11. The information processing apparatus according to claim 1,
wherein the circuitry is further configured to control the relationship between the first coordinate and the second coordinate further based on information of content.

12. The information processing apparatus according to claim 1,
wherein the circuitry is further configured to switch to make the relationship between the first coordinate and the second coordinate one of fixed or variable.

13. The information processing apparatus according to claim 1,
wherein the circuitry is further configured to control a relative acceleration of the second coordinate with respect to an acceleration of the first coordinate.

14. The information processing apparatus according to claim 1,
wherein the circuitry is further configured to control the relationship between the first coordinate and the second coordinate further based on an attitude of a user of the pointing object.

15. An information processing method, comprising:
controlling, by circuitry, a relationship between a first coordinate on a display region, and a second coordinate at which a display object corresponding to a pointing object is displayed on the display region, wherein
the first coordinate is pointed by the pointing object,
the relationship between the first coordinate and the second coordinate is based on a positional relationship between
a first distance from the display region to the pointing object;
increasing, by the circuitry, a relative distance between the first coordinate and the second coordinate as a second distance between a reference point and the first coordinate increases,
wherein the reference point is set based on the positional relationship;
wherein, based on the first distance being shorter than a threshold, the circuitry is further configured to dispose the second coordinate on a side opposite to a side of the reference point; and
wherein, based on the first distance being longer than the threshold, the circuitry is further configured to dispose the second coordinate on a same side as the side of the reference point.

16. A non-transitory computer-readable medium having stored thereon, computer-executable instructions, which when executed by a computer, cause the computer to execute operations, the operations comprising:
controlling a relationship between a first coordinate on a display region, and a second coordinate at which a display object corresponding to a pointing object is displayed on the display region, wherein
the first coordinate is pointed by the pointing object,
the relationship between the first coordinate and the second coordinate is based on a positional relationship between
a first distance from the display region to the pointing object;
increasing, a relative distance between the first coordinate and the second coordinate as a second distance between a reference point and the first coordinate increases,
wherein the reference point is set based on the positional relationship;
wherein, based on the first distance being shorter than a threshold, the circuitry is further configured to dispose the second coordinate on a side opposite to a side of the reference point; and
wherein, based on the first distance being longer than the threshold, the circuitry is further configured to dispose the second coordinate on a same side as the side of the reference point.

* * * * *